United States Patent [19]
Barrett et al.

[11] Patent Number: 5,247,658
[45] Date of Patent: Sep. 21, 1993

[54] METHOD AND SYSTEM FOR TRAVERSING LINKED LIST RECORD BASED UPON WRITE-ONCE PREDETERMINED BIT VALUE OF SECONDARY POINTERS

[75] Inventors: Phillip L. Barrett, Redmond; Scott D. Quinn, Kirkland; Ralph A. Lipe, Seattle, all of Wash.

[73] Assignee: Microsoft Corporation, Redmond, Wash.

[21] Appl. No.: 430,746

[22] Filed: Oct. 31, 1989

[51] Int. Cl.$^5$ .............................................. G06F 15/40
[52] U.S. Cl. .......................... 395/600; 364/DIG. 1; 364/282.2; 364/282.3; 364/283.1; 364/283.2; 364/966.2; 364/974.3; 364/974.5
[58] Field of Search ... 364/200 MS File, 900 MS File; 369/47, 48, 49, 59; 371/10.2; 395/600

[56] References Cited

U.S. PATENT DOCUMENTS

| | | | |
|---|---|---|---|
| 4,408,273 | 10/1983 | Plow | 364/200 |
| 4,507,752 | 3/1985 | McKenna et al. | 395/775 |
| 4,584,644 | 4/1986 | Larner | 364/200 |
| 4,606,002 | 8/1986 | Waisman et al. | 364/200 |
| 4,630,234 | 12/1986 | Holly | 395/600 |
| 4,704,678 | 11/1987 | May | 364/200 |
| 4,953,080 | 8/1990 | Dysart et al. | 364/200 |
| 4,953,122 | 8/1990 | Williams | 364/900 |
| 4,989,132 | 1/1991 | Mellender et al. | 395/700 |
| 5,025,367 | 6/1991 | Gurd et al. | 364/200 |
| 5,060,147 | 10/1991 | Mattheyses | 395/650 |
| 5,115,504 | 5/1992 | Belove et al. | 395/600 |

OTHER PUBLICATIONS

Kruse, "Data Structures & Program Design", by Prentice-Hall 1984, pp. 40–83.
Cooper et al., "OH! Pascal", 1982; pp. 475–523.

Primary Examiner—Parshotam S. Lall
Assistant Examiner—Krisna Lim
Attorney, Agent, or Firm—Seed and Berry

[57] ABSTRACT

A method and apparatus for storing files on a computer file storage device. The files are organized into an hierarchical directory structure. The directory structure comprises directory entries and file entries. The file entries and directory each contain a primary and a secondary pointer. The secondary pointer is initially set to a predefined value. When an entry is to be updated, the secondary pointer is overridden with a value that points to the superseding entry. This directory structure is especially suitable to be used in a write-once computer memory.

31 Claims, 26 Drawing Sheets

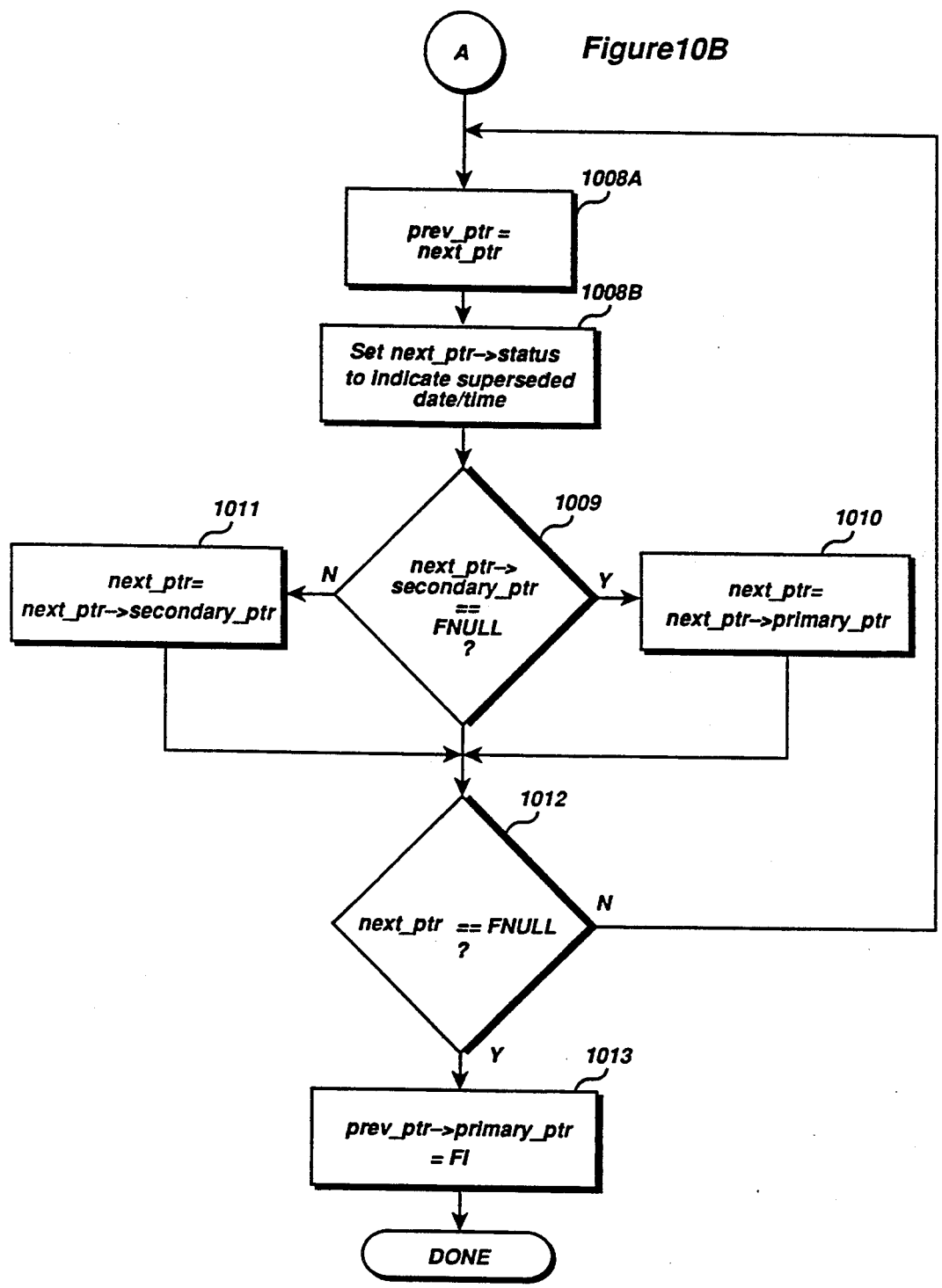

METHOD AND SYSTEM FOR TRAVERSING LINKED LIST RECORD BASED UPON WRITE-ONCE PREDETERMINED BIT VALUE OF SECONDARY POINTERS

DESCRIPTION

Technical Field

This invention relates generally to a computer system for managing files and, more specifically, to a method and system for managing files stored on a FlaSH-erasable, programmable, read-only memory (FEProm).

Background Art

A computer system generally supports the storage of information on both volatile and nonvolatile storage devices. The difference between a volatile and nonvolatile storage device is that when power is disconnected from a volatile storage device the information is lost. Conversely, when power is disconnected from a nonvolatile storage device the information is not lost. Thus, the storing of information on a nonvolatile storage device allows a user to enter information at one time and retrieve the information at a later time, even though the computer system may have been powered down. A user could also disconnect a nonvolatile storage device from a computer and connect the storage device to a different computer to allow the different computer to access the information.

The information stored on nonvolatile storage devices is generally organized into files. A file is a collection of related information. Over the course of time, a computer system can store hundreds and thousands of files on a storage device, depending upon the capacity of the device. In addition to storing the information, the computer system will typically read, modify, and delete the information in the files. It is important that the computer system organize the files on the storage device so that the storing, reading, modifying, and deleting can be accomplished efficiently.

File systems, which are generally part of a computer operating system, were developed to aid in the management of the files on storage devices. One such file system was developed by Microsoft Corporation for its Disk Operating System (MS-DOS). This file system uses a hierarchical approach to storing files. FIG. 1A shows a pictorial representation of the directory structure for a storage device. Directories contain a logical group of files. Directories organize files in a manner that is analogous to the way that folders in a drawer organize the papers in the drawer. The blocks labeled DOS, WORD, DAVID, and MARY represent directories, and the blocks labeled AUTOEXEC.BAT, COMMAND.COM, FORMAT.EXE, LETTER2.DOC, LETTER.DOC, and two files named LETTER1.DOC represent files. The directory structure allows a user to organize files by placing related files in their own directories. In this example, the directory WORD may contain all the files generated by the word-processing program WORD. Within directory WORD are two subdirectories DAVID and MARY, which aid in further organizing the WORD files into those developed by David and those developed by Mary.

Conventional file systems take advantage of the multiple-write capability of the nonvolatile store devices. The multiple-write capability allows any bit of information on the storage device to be changed from a one to zero and from a zero to one a virtually unlimited number of times. This capability allows a file to be written to the storage device and then selectively modified by changing some bits of the file.

The disadvantage of the conventional storage devices with multiple-write capability, such as a disk, is their slow speed relative to the speed of the internal computer memory. Conversely, the advantage of these storage devices over computer memory include their nonvolatility, low cost, and high capacity A storage device known as a FlaSH-EProm (FEProm) has the speed of internal computer memory combined with the nonvolatility of a computer disk. This device is an EProm-type (Erasable, Programmable, Read-Only Memory) device. The contents of the FEProm can be erased by applying a certain voltage to an input rather by shining ultraviolet light on the device like the typical EProm. The erasing sets each bit in the device to the same value. Like other EProms, the FEProm is a nonvolatile memory. The FEProms are comparable in speed to the internal memory of a computer. Initially, and after erased, each bit of the FEProm is set to a 1. A characteristic of the FEProm as with other EProms is that a bit value of 1 can be changed to a 0, but a bit value of 0 cannot be changed to a 1. Thus, data can be written to the EProm to effect the changing of a bit from a 1 to a 0. However, once a bit is changed to a 0, it cannot be changed back to a 1, that is, unless the entire FEProm is erased to all ones. Effectively, each bit of the FEProm can only be written once but read many times between subsequent erasures. Moreover, each bit of a FEProm can only be erased and set to 0 a limited number of times. The limited number of times defines the effective life of a FEProm.

Because conventional file systems assume that the storage device has the multiple-write capability, these file systems are not appropriate for the FEProm, which effectively has only a single-write capability. It would be desirable to have a file system that supports a storage device based on the FEProm. Such a file system would have the speed of computer memory and the nonvolatility of computer disks.

Conventional storage devices, such as computer disks, are block addressable, rather than byte addressable. A byte is the unit of addressability of the internal memory of the computer, that is, the computer can write or read one byte (typically, eight bits) at a time, but not less. When the computer writes to or reads from a disk it must do so in groups of bytes called a block. Block sizes can vary, but typically are a power of two (128, 256, 512, etc.). For example, if only one byte on a disk is to be changed, then the entire number of bytes in the block size must be written. This may involve the reading of the entire block from disk into the computer memory, changing the one byte (the internal memory is byte addressable), and writing the entire block to the disk.

Conventional file systems store data in a way that leaves unused portions of blocks. The file systems store data from only one file in any given block at a time. The file systems do not, for example, store data from one file in the first 50 bytes of a block and data from another file the last 78 bytes of a 128-byte block. If, however, the length of a file is not an even multiple of the block size, space at the end of a block is unused. In the example above, the last 78 bytes of the block would be unused. When a disk uses a large block size such as 4096, up to 4095 bytes of data can be unused. Although this used space may be a negligible amount on a disk drive that has multi-write capability and that can store millions of bytes, it may be a significant amount on a storage device without multi-write capability and without the capacity to store millions of bytes of data.

The FEProm, in contrast to typical storage devices, is byte addressable, rather than block addressable. It would be desirable to have a file system that would support the byte addressability of a FEProm.

DISCLOSURE OF THE INVENTION

It is an object of the present invention to provide a method of updating data stored on a file storage device.

It is another object of the present invention to provide a method of storing a file on a file storage device.

It is another object of the present invention to provide a method of updating directory and file entries of a hierarchical directory structure on a file storage device.

It is another object of the present invention to provide a method of updating a file on a file storage device, the file having a linked list of information entries and the information entries having associated extents.

It is another object of the present invention to provide a method of updating a portion of a file extent stored on a file storage device.

These and other objects, which will become apparent as the invention is more fully described below, are obtained by an improved method and system for storing and updating files stored on a FlaSH-erasable, programmable, read-only memory. In a preferred embodiment, the system uses a secondary pointer to indicate that data stored in a file system data structure has been superseded. The secondary pointer points to a record that contains the superseding data.

BRIEF DESCRIPTION OF THE DRAWINGS

FIGS. 10A and 10B show a flow diagram of the Extend_File routine in a preferred embodiment of the present invention.

DETAILED DESCRIPTION OF THE INVENTION

TABLE 1

Figure 1A:
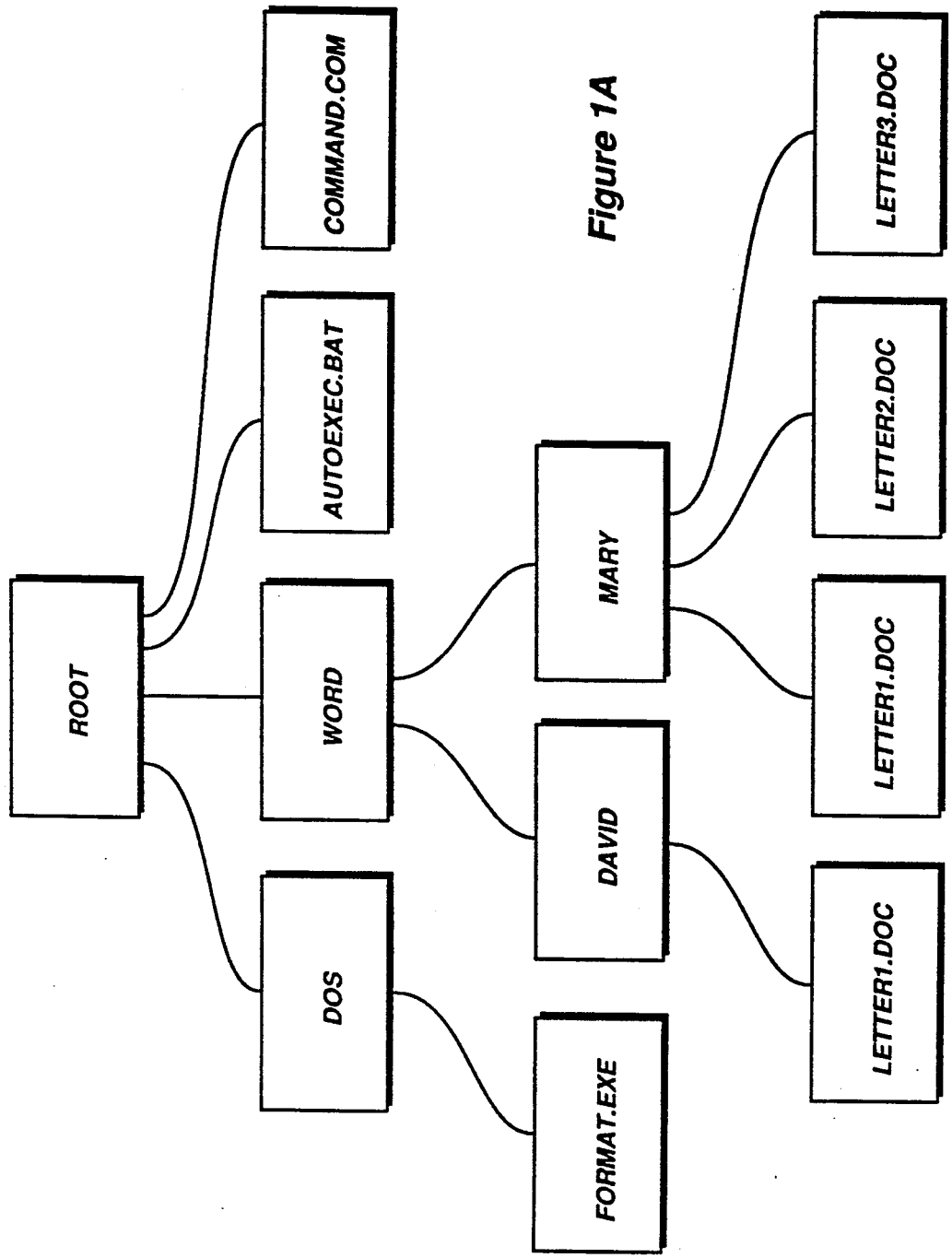
FIG. 1A shows a sample hierarchical or tree-structured organization of directories and files.

| | |
|---|---|
| typedef boot_record { | |
| word | standard_identifier; |
| dword | unique_identifier; |
| word | FS_version_write; |
| word | min_FS_version_to_read; |
| byte | pointer_size; |
| FEptr | root_directory; |
| char | vol_label[11] |
| char | boot_info[..];} |
| standard_identifier | a value which indicates that the media supports this file system |
| unique_identifier | combined with vol_label is a unique identifier for the particular FEProm |
| FS_version_write | version number in high byte and revision number in low byte of file system that is required to write to this volume |
| min_FS_version_to_read | version number in high byte and revision number in low byte of the earliest version of file system that directory structure is compatible with |
| pointer_size | number of bits used in pointers |
| root_directory | pointer to root directory |
| vol_label | eleven character label |
| boot_info | data relating to booting the operating system |

```
typedef status_type {
unsigned bit_0:1;
unsigned bit_1:1;
unsigned bit_2:1;
unsigned bit_3:1;
unsigned bit_4:1;
unsigned bit_5:1;
unsigned bit_6_7:2;}
typedef FEDirEntry {
FEptr              sibling;
char               name[8];
char               ext[3];
status_type        status;
FEptr              primary_ptr;
FEptr              secondary_ptr;
byte               attributes;
short              time;
short              date;};
typedef FEFileEntry {
FEptr              sibling;
char               name[8];
```

TABLE 1-continued

| | |
|---|---|
| char | ext[3]; |
| status_type | status; |
| FEPtr | primary_ptr; |
| FEPtr | secondary_ptr; |
| byte | attributes; |
| short | time; |
| short | date; |
| FEPtr | extent_location; |
| short | extent_length;} |
| typedef FEFileInfo { | |
| byte | status; |
| FEPtr | primary_ptr; |
| FEPtr | secondary_ptr; |
| FEPtr | extent_location; |
| short | extent_length; |
| byte | attributes; |
| short | time; |
| short | date; |
| sibling | pointer to next directory entry in sibling chain |
| name | directory/file name |
| ext | file extension |
| status | |
| bit # | meaning |
| 0 | 1:record exists in the directory structure<br>0:record has been deleted from the directory structure |
| 1 | 1:record contains current attributes, date, and time data<br>0:record contains data that has been superseded or no data |
| 2 | 1:FEFileEntry<br>0:FEDirEntry |
| 3 | 1:sibling is FNULL<br>0:sibling is not FNULL |
| 4 | 1:primary_ptr is FNULL<br>0:primary_ptr is not FNULL |
| 5 | 1:secondary_ptr is FNULL<br>0:secondary_ptr is not FNULL |
| 6-7 | reserved |
| primary_ptr | FEDirEntry: points to the first FEDirEntry or FEFileEntry on the next lower level in the directory hierarchy; only valid if secondary_ptr equals FNULL<br>FEFileEntry: points to the linked list of FEFileInfo entries associated with the file; only valid if secondary_ptr equals FNULL<br>FEFileInfo: points to the next FEFileInfo entry for the file; only valid if secondary_ptr equals FNULL |
| secondary_ptr | FEDirEntry: points to the next FEDirEntry entry for the directory; the last entry in the linked list contains the current information for the directory; only valid if not FNULL<br>FEFileEntry: points to the next FEFileEntry entry for the file; the last entry in the linked list contains the current information for the file; only valid if not FNULL<br>FEFileInfo: points to the next FEFileInfo entry for the file; only valid if not FNULL |
| attributes | file attributes such as read-only, read/write, etc. |
| time | time of creation or modification |
| date | date of creation or modification |
| extent_location | points to start of extent |
| extent_length | length of extent in bytes |

The present invention provides a directory-based hierarchical file system for a FEProm device. A hierarchical file system provides a way to store files in logical groupings. A preferred embodiment uses a linked-list data structure to implement both the directory hierarchy and the internal file storage.

FIG. 1A shows a typical hierarchical directory structure. The MS-DOS operating system, which is available from Microsoft Corporation of Redmond, Wash., implements a file system with a hierarchical directory structure. As shown in FIG. 1A, the ROOT directory contains two subdirectories (DOS and WORD) and two files (AUTOEXEC.BAT and COMMAND.COM) at the next lower level. The directory DOS contains one file (FORMAT.EXE). The directory WORD contains two subdirectories (DAVID and MARY) at the next lower level. The directory DAVID contains one file LETTER1.DOC. The directory MARY contains three files LETTER1.DOC, LETTER2.DOC, and LETTER3.DOC.

Figure 1B:
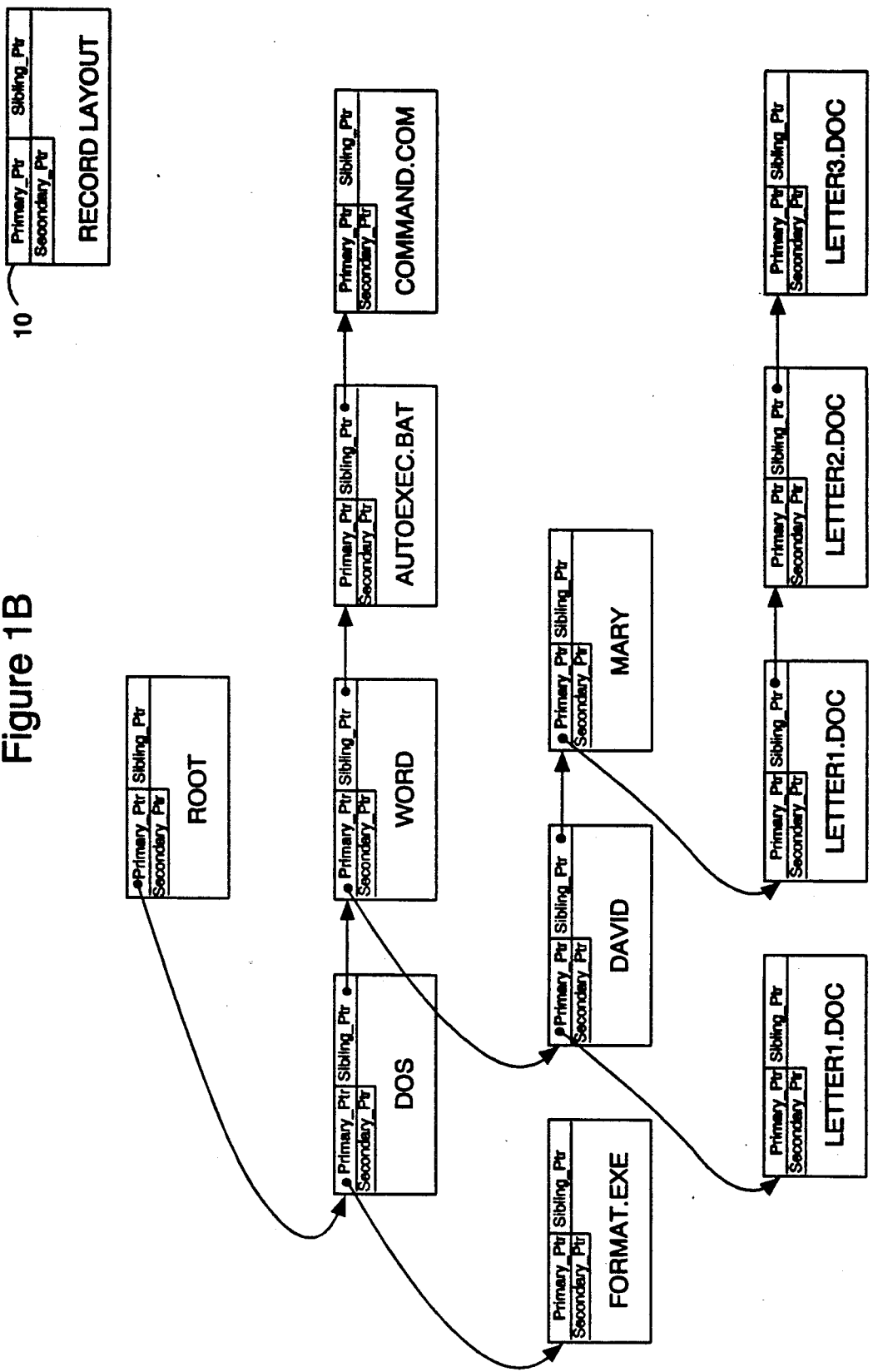
FIG. 1B shows a linked-list structure that represents the same directory structure of FIG. 1A.

FIG. 1B shows a possible linked list that in a preferred embodiment implements the directory structure of FIG. 1A. The ROOT directory record (the terms record and entry are used interchangeably in this specification) has a pointer which points to a linked list of subdirectory records and file records at the next lower level. The subdirectory record DOS has a pointer to the file record at the next lower level, and the subdirectory record WORD has a pointer to a linked list of subdirectory records at the next lower level. The subdirectory record DAVID has a pointer to the file at the next lower level, and the subdirectory record MARY has a pointer to a linked list of file records at the next lower level. The template 10 shows the record layout used throughout the drawings.

Figure 1C:
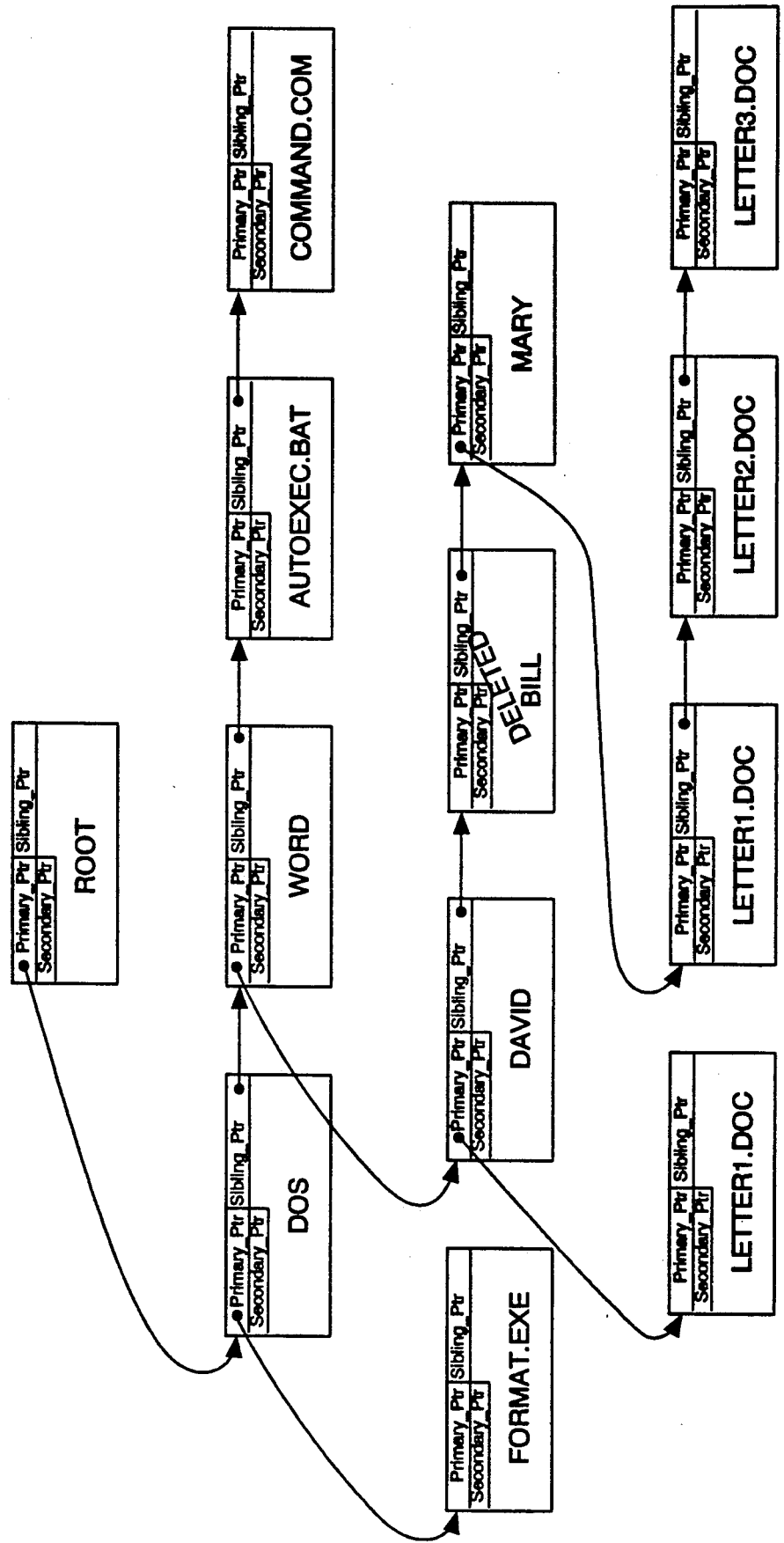
FIG. 1C shows an alternate linked-list structure that represents the same directory structure of FIG. 1A.

FIG. 1B represents just one possible linked list arrangement that represents FIG. 1A. The arrangement would be different if files had been added but then deleted or if the name of a directory was changed. FIG. 1C shows another possible arrangement. FIG. 1C represents the same directory hierarchy as FIG. 1A, but the directory BILL existed at one time but has been deleted.

Because a FEProm device can be written only once, in a preferred embodiment of the present invention, directory record BILL, as shown in FIG. 1C, is not physically removed from the linked list. A directory or file record is deleted from the linked list by logically clearing the exist/delete bit of the status byte of the directory or file entry. If the directory or file was stored on a computer disk, then directory record BILL could be physically removed by rewriting the pointer in directory record DAVID to point to directory record MARY.

Figure 2A:
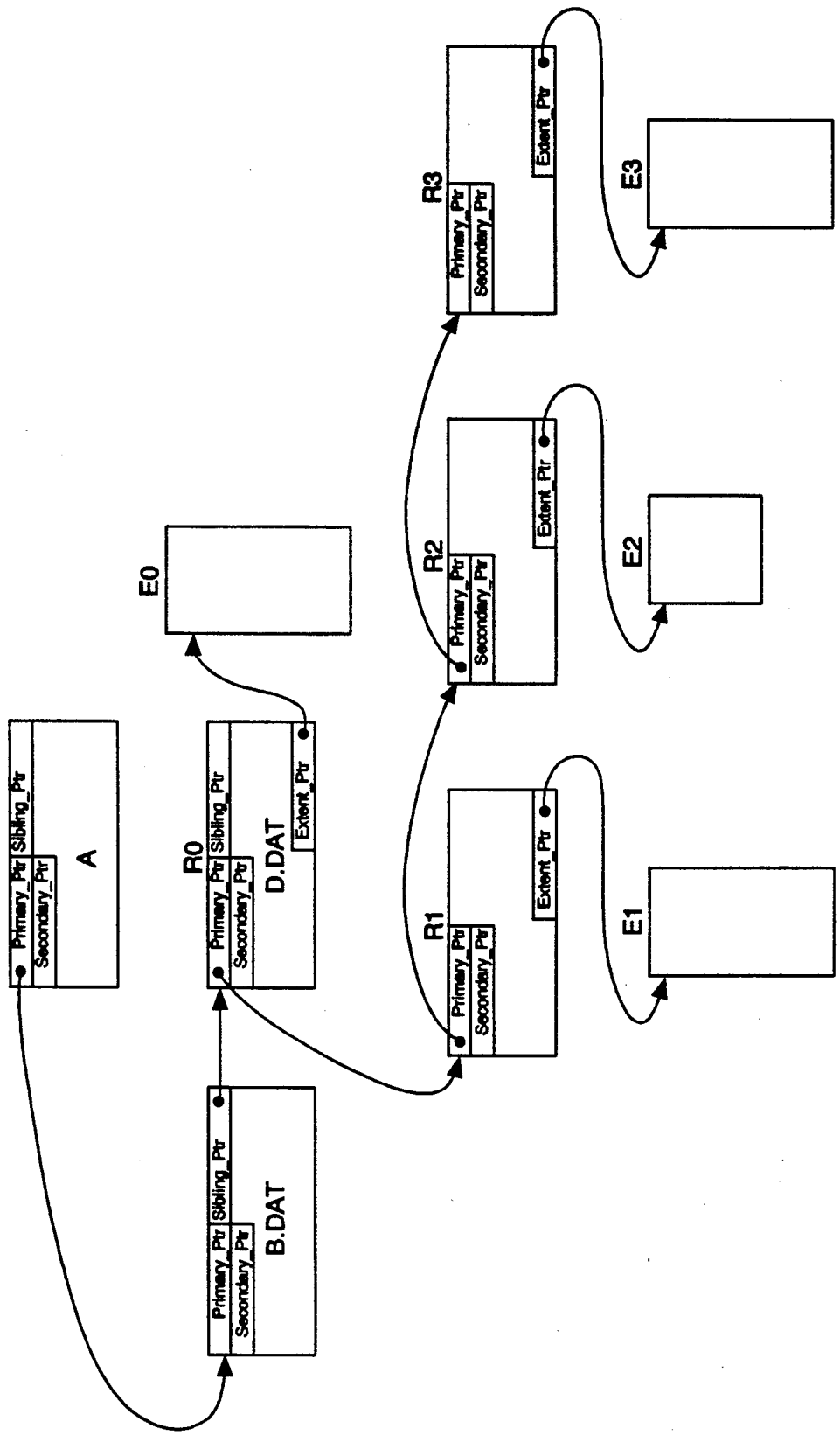
FIG. 2A shows a linked-list structure for the file named " \ A \ D.DAT".

A preferred embodiment also uses a linked-list data structure to link the extents that compose a file. Each file has a file record associated with it that contains, among other data, the name of the file and that is linked into the directory hierarchy as described above. An extent is a contiguous area of memory that contains data for the file. Each file comprises one or more extents which contain the file data. Each extent has an extent record associated with it. The extent record contains, among other data, the start address of the extent and the length of the extent. FIG. 2A shows the extents of the file " \ A \ D.DAT". The file record (R0) also serves as the extent for the first extent in a file and contains a pointer to the first extent (E0). The extent records (R1, R2, and R3) are linked and contain a pointer to the corresponding extents (E1, E2, and E3). The file is the logical concatenation of extents E0, E1, E2, and E3.

Figure 2B:
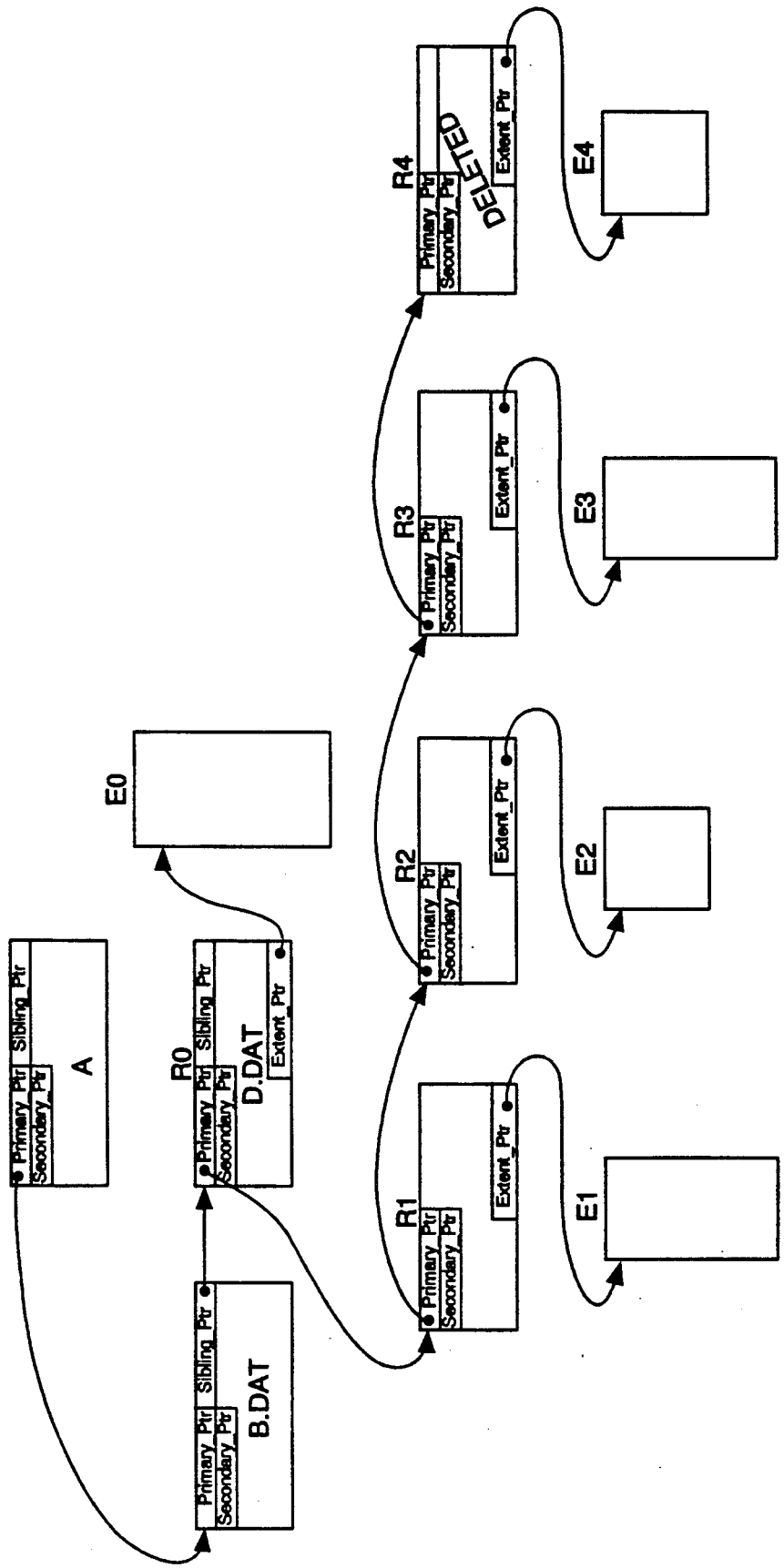
FIG. 2B shows an alternate linked-list structure for the file named " \ A \ D.DAT".

FIG. 2A represents just one possible linked list arrangement for file "\A\ D.DAT". FIG. 2B shows another arrangement that represents the same file. The extent E4 was added to the file but then deleted. In a preferred embodiment, the file record R4 is not physically removed from the linked list of extents that compose the file. Rather, the record R4 is logically removed by setting the exist/delete bit of the status byte to indicate the record is deleted.

Figure 3:
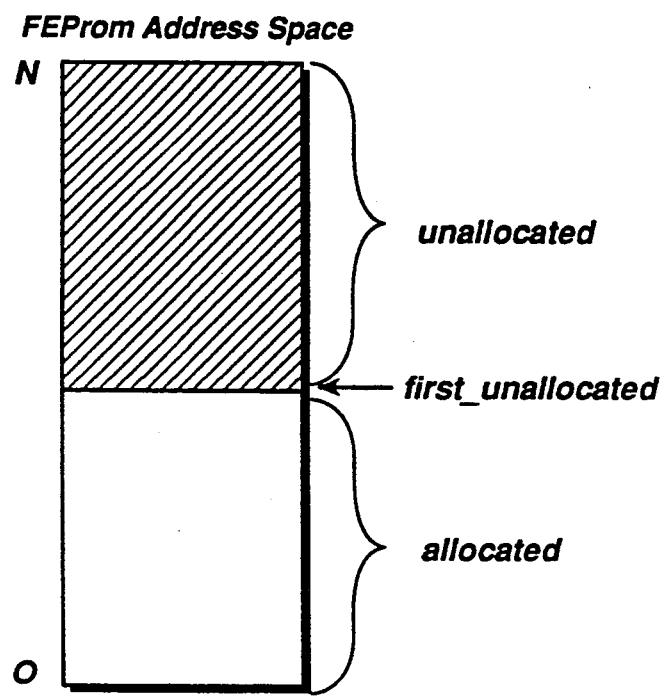
FIG. 3 shows the address space of the FEProm in a preferred embodiment of the present invention.

In a preferred embodiment of the present invention, the file system adds directory records, file records, extent records, and extents by allocating space starting from address zero in the FEProm. The file system treats the FEProm as a stack-like device. Data is pushed onto the stack to effect allocation, but data is never popped from the stack. FIG. 3 shows the allocated and unallocated portion of a FEProm. The variable first_unallocated points to the lowest address in the unallocated portion. Each byte of the unallocated portion contains FNULLs, since it has not yet been written to by the file system. An FNULL is a byte that contains all 1s. When a FEProm is erased each byte contains an FNULL.

In a preferred embodiment, the first_unallocated pointer is not stored on the FEProm. When a FEProm is first connected to the computer (i.e., put on-line), the file system searches the FEProm from the highest address location to the lowest address for the first occurrence of a non-FNULL byte. The next higher address is the start of the unallocated area (first_unallocated). The file system should ensure that the data stored at the end of the allocated portion does not contain a FNULL. This can be accomplished by adding a non-FNULL byte to the end of any record or extent that ends in an FNULL.

Table 1 contains several data structures used in a preferred embodiment of the present invention. The structures are shown in C programming language format along with a description of the structure variables. The first data structure stored on the FEProm is the boot_record. The boot_record contains some general information relating to the identification of the FEProm, the version number of file system that can access the FEProm, the pointer_size variable, and the root directory variable. The pointer_size indicates the byte-size of the pointers stored in the FEProm. For example, a pointer size with value of 3 indicates that each pointer is three bytes. The root_directory is a pointer to the root directory stored on the FEProm.

The second and third structures are the FEDirEntry and FEFileEntry structures. One of these structures is allocated for each directory and file. The structures are identical except that the FEFileEntry has extent location and extent length variables. The variable sibling points to the next sibling in the linked list of FEDirEntry and FEFileEntry structures at the same level in the directory hierarchy. The variables primary_ptr and secondary_ptr are fully described below.

Figure 4:
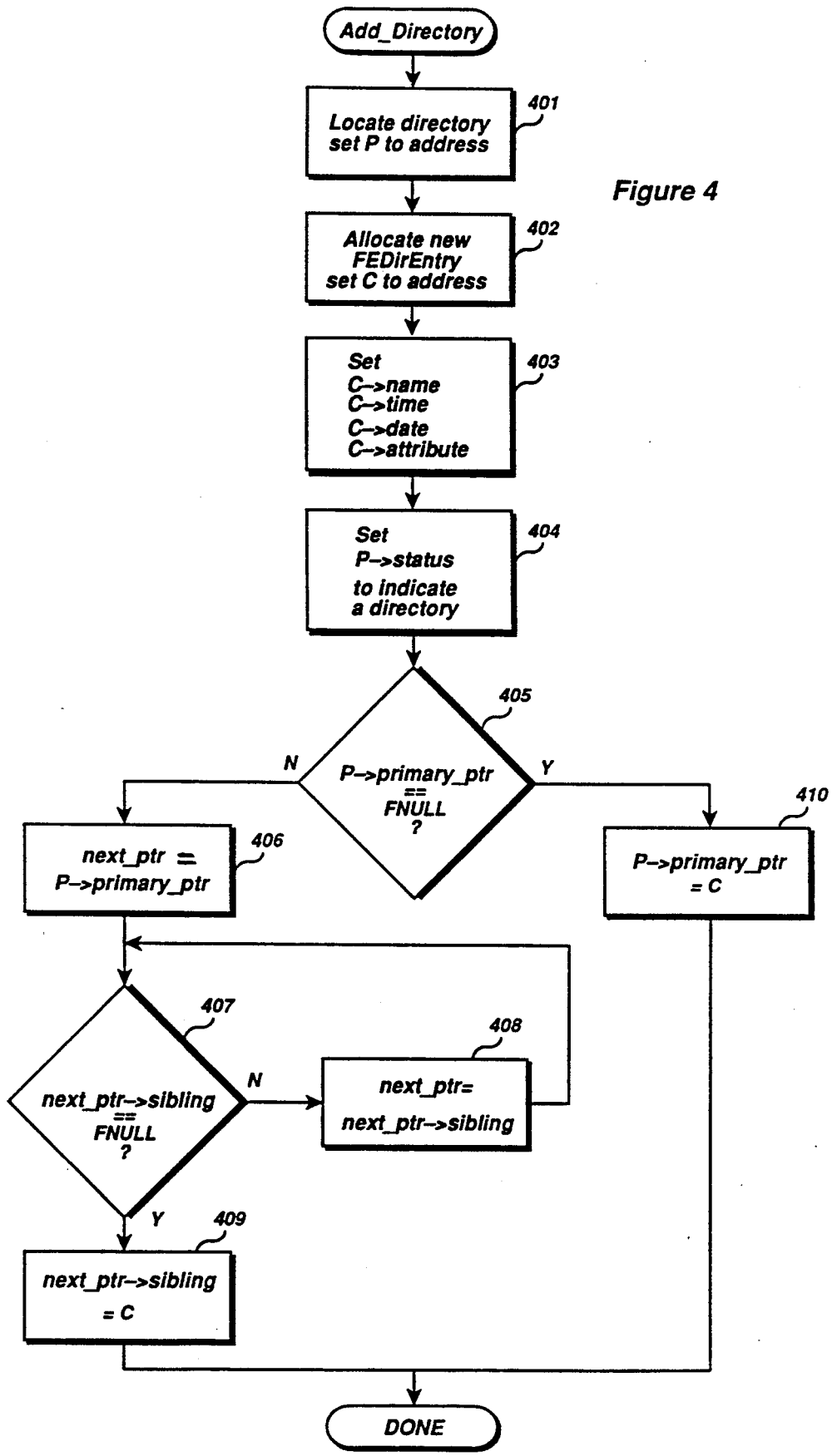
FIG. 4 shows a flow diagram of the Add_Directory routine in a in a preferred embodiment of the present invention.
Figure 5:
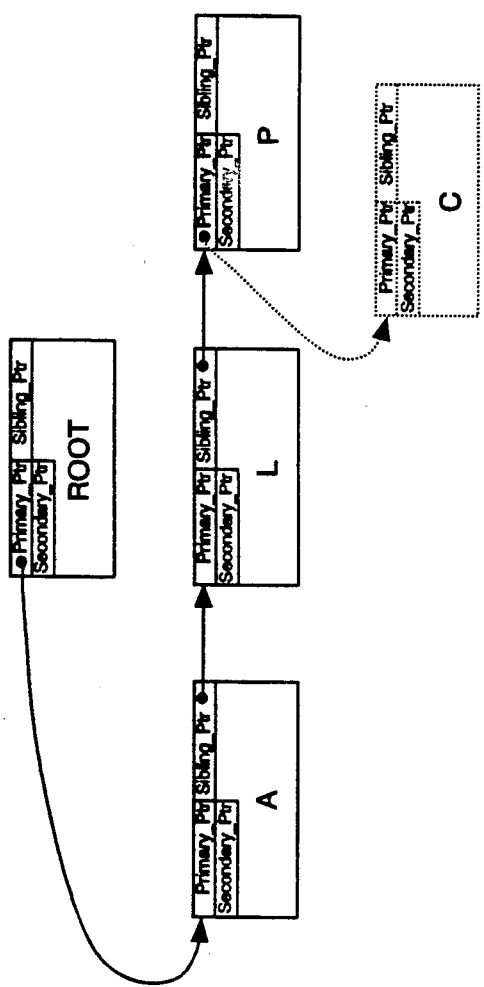
FIGS. 5 and 6 show before and after pictorials of the directory structure with a newly added directory in a preferred embodiment of the present invention.
Figure 6:
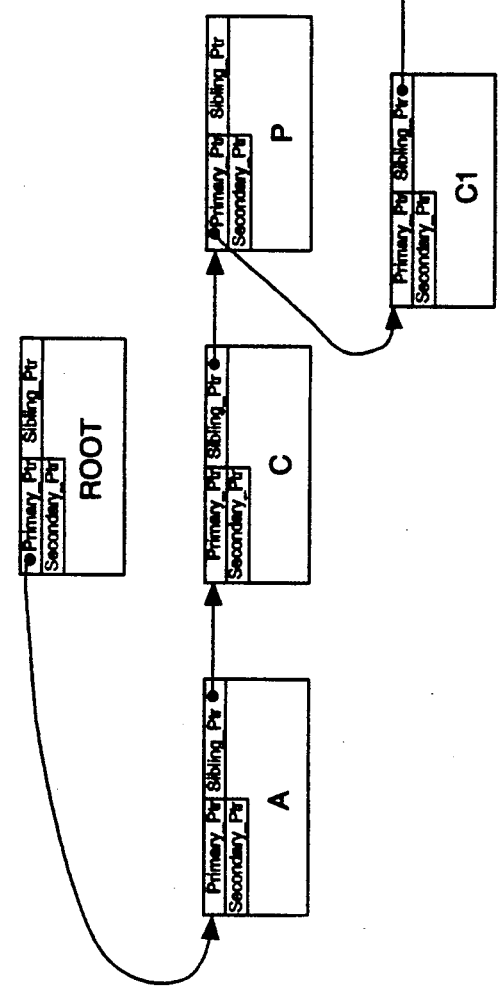

Described below is a preferred method of a file system for a FEProm. The file system allows for directories to be added and deleted, and files to be created, extended, and modified. FIG. 4 shows a flow diagram for the routine that adds a directory to a storage device. The input parameters to this routine are the complete pathname of the new directory and attribute data for the new directory. The term attribute data as used below refers to the attribute, date, and time values. This routine will set the variable P to point to the parent directory and the variable C to point to the child directory. For example, the path name " \ P \ C" means that a directory "C" is to be created that is a subdirectory of "P," which is a subdirectory of the root directory. FIG. 5 shows when "C" would be the first subdirectory of "P," and FIG. 6 shows when "C" would not be the first subdirectory of "P". Referring to FIGS. 5 and 6, the solid lines show the directory structure before "C" is added and the broken lines show the directory structure after "C" is added.

Figure 7B:
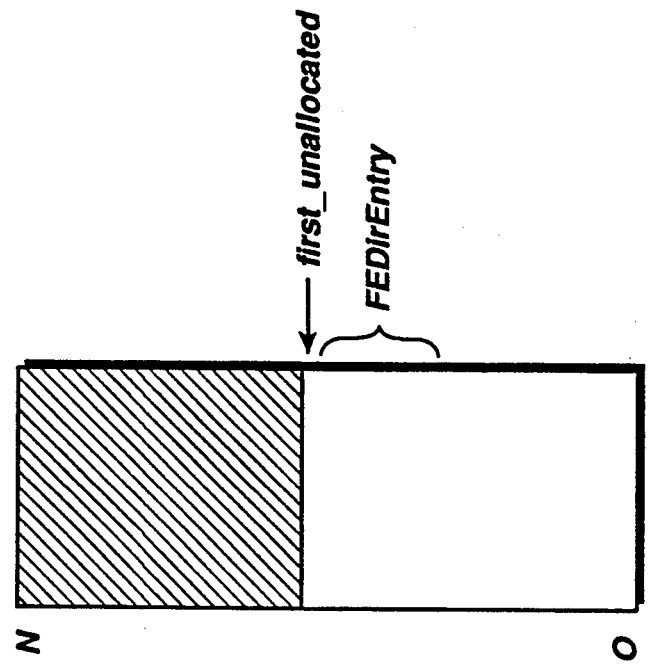
FIGS. 7A and 7B show a before and after pictorial representation of the allocation of an FEDirEntry in a preferred embodiment of the present invention.
Figure 7A:
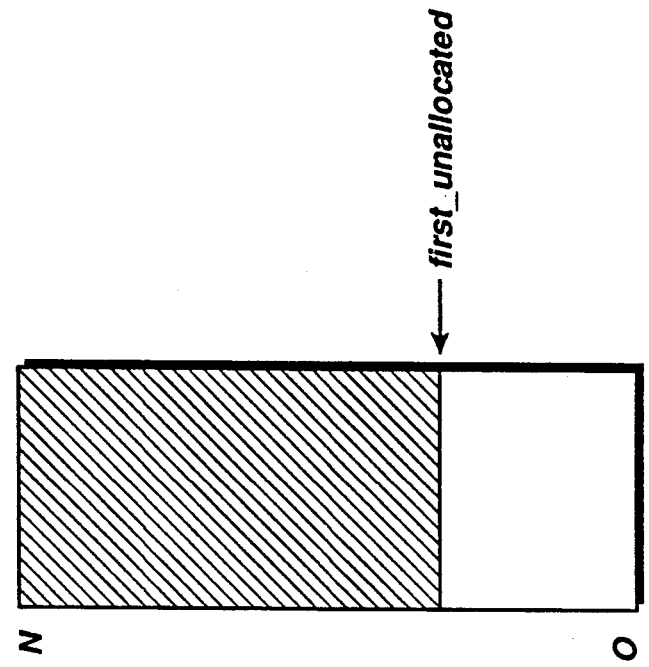

In block 401 of FIG. 4, the system locates directory "P" by following the path from the root directory and setting variable P to the address of "P" directory. In block 402, the system allocates a new directory entry of the record type FEDirEntry for directory "C." The system sets the variable C to the variable first_unallocated and allocates the space by incrementing the variable first_unallocated by the size of an FEDirEntry record. FIGS. 7A and 7B show the address space before allocation and after allocation of the FEDirEntry record, respectively. In block 403, the system sets the variables name, time, date, and attribute in the newly allocated record. In block 404, the system sets the status bit to indicate that the newly allocated entry is a directory entry, rather than a file entry.

In blocks 405 through 410, the system links the new directory entry into the old directory structure. In blocks 406 through 409, the system handles the situation where the new directory is not the first subdirectory of "P." In block 410, the system handles the situation where the new directory is the first subdirectory of "P." In block 405, if P—>primary_ptr equals FNULL, then the "P" directory has no subdirectory and the system continues at block 410, else the "P" directory has or has had a subdirectory (discussed below), and the system continues at block 406. In block 410, the system sets P—>primary_ptr equal to the variable C, the address of the newly allocated directory entry to effect the linking to the new directory and then the routine is done.

In block 406, the system sets the variable next_ptr equal to P—>primary_ptr. The variable next_ptr contains the next directory in the chain of sibling subdirectories. In block 407, if next_ptr—>sibling equals FNULL, then the end of the chain of siblings has been reached and the system continues at block 409, else the system continues at block 408. In block 408, the system sets next_ptr equal to next_ptr—>sibling, which advances next_ptr to point to the next directory in the chain, and continues at block 407 to determine if the end of the chain has been reached. In block 409, the system sets next_ptr>sibling equal to C, the address of the newly allocated directory record and then the routine is done.

Figure 8:
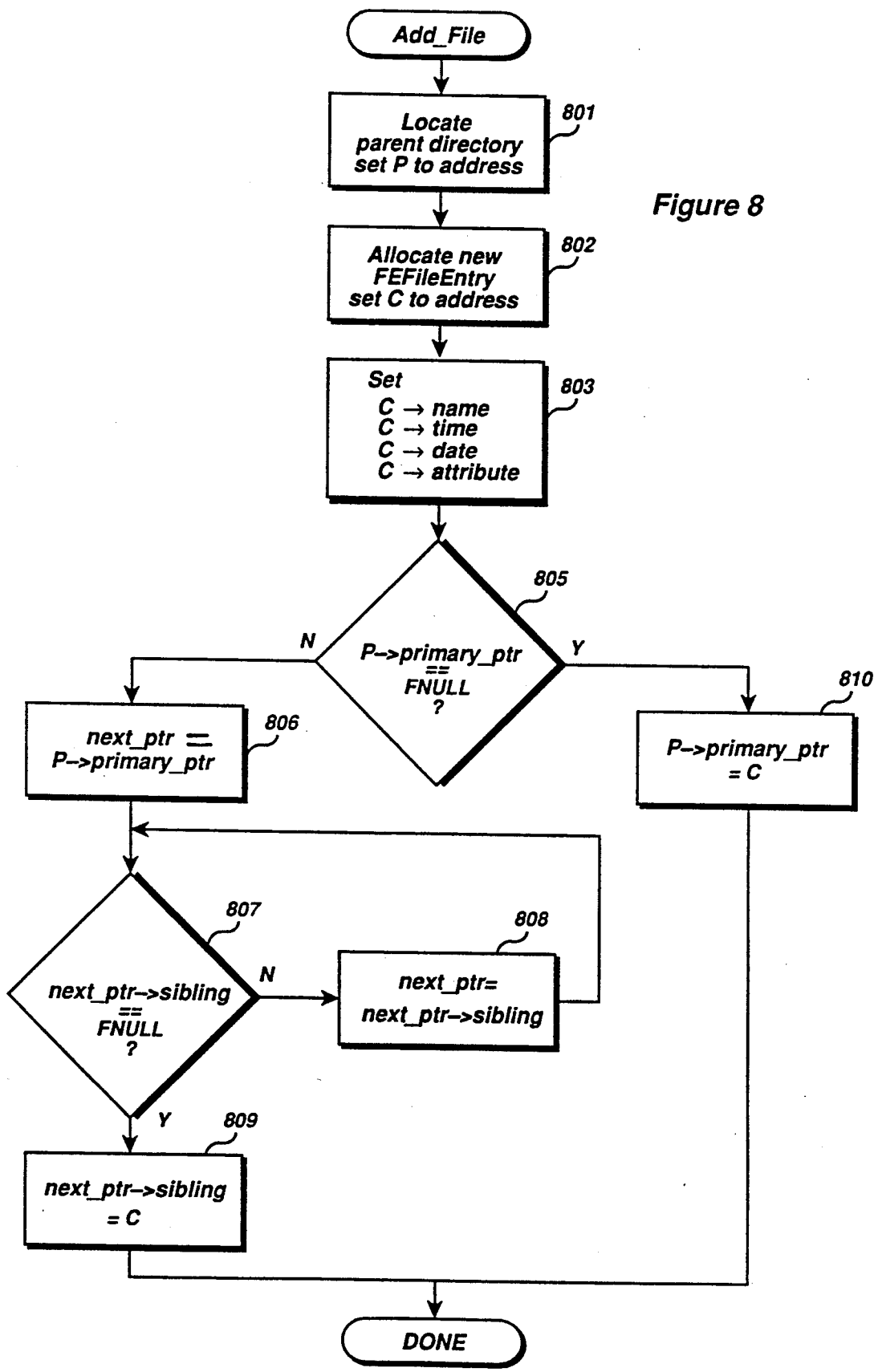
FIG. 8 shows a flow diagram of the Add File routine in a preferred embodiment of the present invention.

FIG. 8 shows a flow diagram of the routine that adds a record into the file system for a new file. Since FEFileEntry records are simply leaf nodes of the hierarchical tree-structured file system, the routine that adds the FEFileEntry records is very similar to the routine for FEDirEntry records, which is Add Directory, shown in FIG. 4. The significant difference is that the status bit that indicates the record is a directory is not cleared as in block 404 of FIG. 4. Thus, the status bit indicates the record is a file record.

Figure 9:
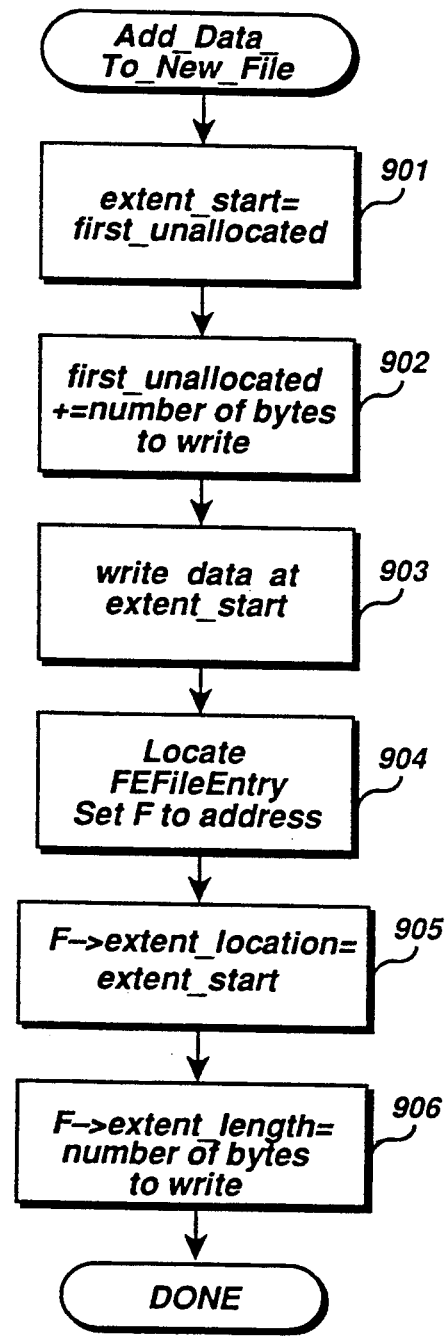
FIG. 9 shows a flow diagram of the Add_Data_To_New_File routine in a preferred embodiment of the present invention.

FIG. 9 shows a flow diagram of the routine that adds data to a newly created file. The routine is passed the complete pathname, the data to write, and the number of bytes to write. The routine allocates space in the FEProm, writes the data, and then updates the FEFileEntry record for the file. In block 901 and 902, the system allocates the space in the FEProm for the extent. In block 901, the system sets the pointer extent_start equal to first_unallocated. In block 902, the system increments first_unallocated by the number of bytes to write. In block 903, the system writes the data to the FEProm at the location pointed to by extent_start. In block 904, the system locates the FEFileEntry record for the file by tracing down the pathname and sets F to point to that record. In block 905, the system sets F—>extent_location equal to extent_start. In block 906, the system sets F—>extent_length equal to the number of bytes to write and then the routine is done.

Figure 10A:
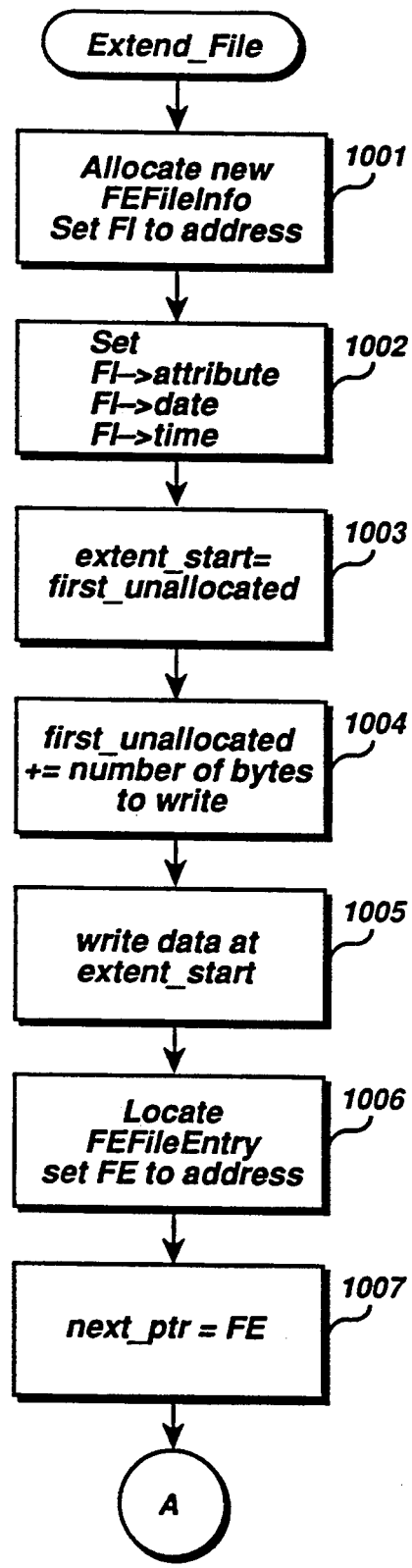
Figure 11:
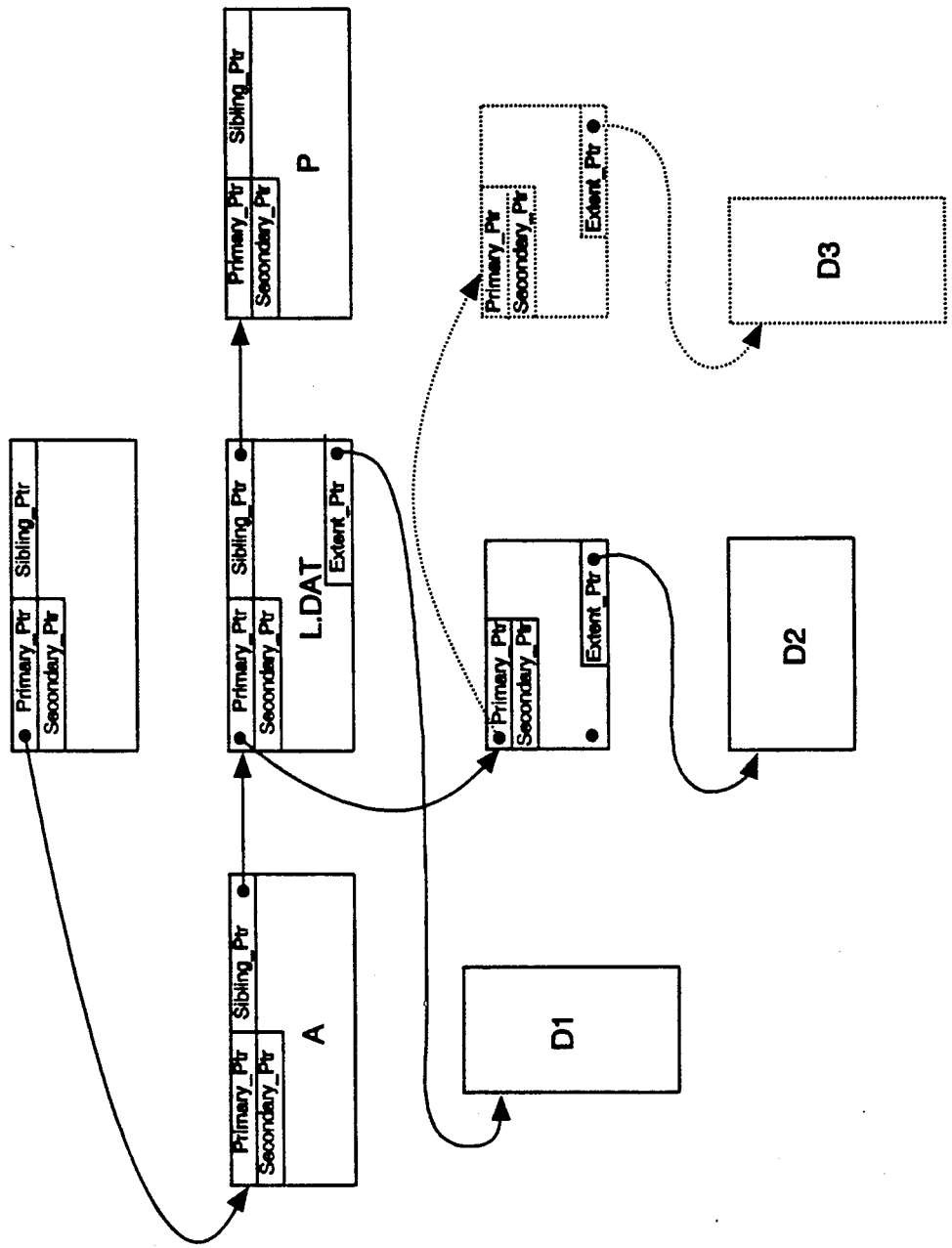
FIG. 11 shows a sample directory and file layout using a preferred embodiment of the present invention.

FIGS. 10A and 10B show a flow diagram of the routine to add data onto the end of a file. This routine is passed the complete pathname, the data to write, and the number of bytes to write. FIG. 11 shows a sample layout of the directory structure that contains the file " \ L.dat" that is to be extended. The solid lines show the structure before the file is extended and the broken lines show the structure after the file is extended. Initially, the file "L.DAT" has a FEFileEntry record and a FEFileInfo record associated with it. Each of these records has a data extent, D1 or D2. The broken lines represent a FEFileInfo record with the data to be added to the file in extent D3.

Referring to FIGS. 10A and 10B in block 1001, the system allocates a new FEFileInfo record in the FEProm and sets the pointer FI to contain the address of that record. In block 1002, the system sets FI—>date, FI—>time, and FI—>attribute. In blocks 1003 and 1004, the system allocates space in the FEProm for the data that is to extend the file. In block 1003, the system sets the variable extent_start equal to first_unallocated. In block 1004, the system increments first_unallocated by the number of bytes to write. In block 1005, the system writes the data to the FEProm starting at the location pointed to by extent_start. In block 1006, the system locates the FEFileEntry record for the file to be extended and sets FE to point to that record. In a preferred embodiment, the system would locate the FEFileEntry record before allocating the new extent and FEFileInfo record to ensure that the file exists before any allocation is done.

In blocks 1007 through 1012, the system locates the last FEFileInfo record for the file to be extended. The system follows the primary_ptr or the secondary_ptr of the FEFileEntry record and the FEFileInfo records. A non-FNULL value in the secondary_ptr field indicates that the record pointed to by the primary_ptr has been superseded by the data in the record pointed to by the secondary_ptr. In block 1007, the system sets pointer next_ptr equal to FE, which is the address of the FEFileEntry record. In block 1008A, the system sets the pointer prev_ptr equal to next_ptr. When the last FEFileInfo record in the file is located, the pointer prev_ptr will contain the address of that record. In block 1008B, the system sets the next_to>indicate that the attributes, date, and time are superseded. This will ensure that the newly allocated FEFileInfo record will be the only record for the file with current attribute, date, and time data. In block 1009, if next—>secondary_ptr equals FNULL, then the data in the record pointed to by the primary_ptr has not been superseded and the system continues at block 1010, else the system continues at block 1011. In block 1010, the system sets next_ptr equal to next_ptr—>primary_ptr to get the address of the next record in the linked list and continues at block 1012. In block 1011, the system sets next equal to next_ptr—>secondary_ptr to get the address of the next record in the linked list and continues at block 1012. In block 1012, if next_ptr equals FNULL, then the end of the list has been reached and the system continues at block 1013, else the system continues at 1008A to process the next record in the list. In block 1013, the system sets prev_ptr—>primary_ptr equal to FI to effect the extending of the file and the routine is done.

Figure 12:
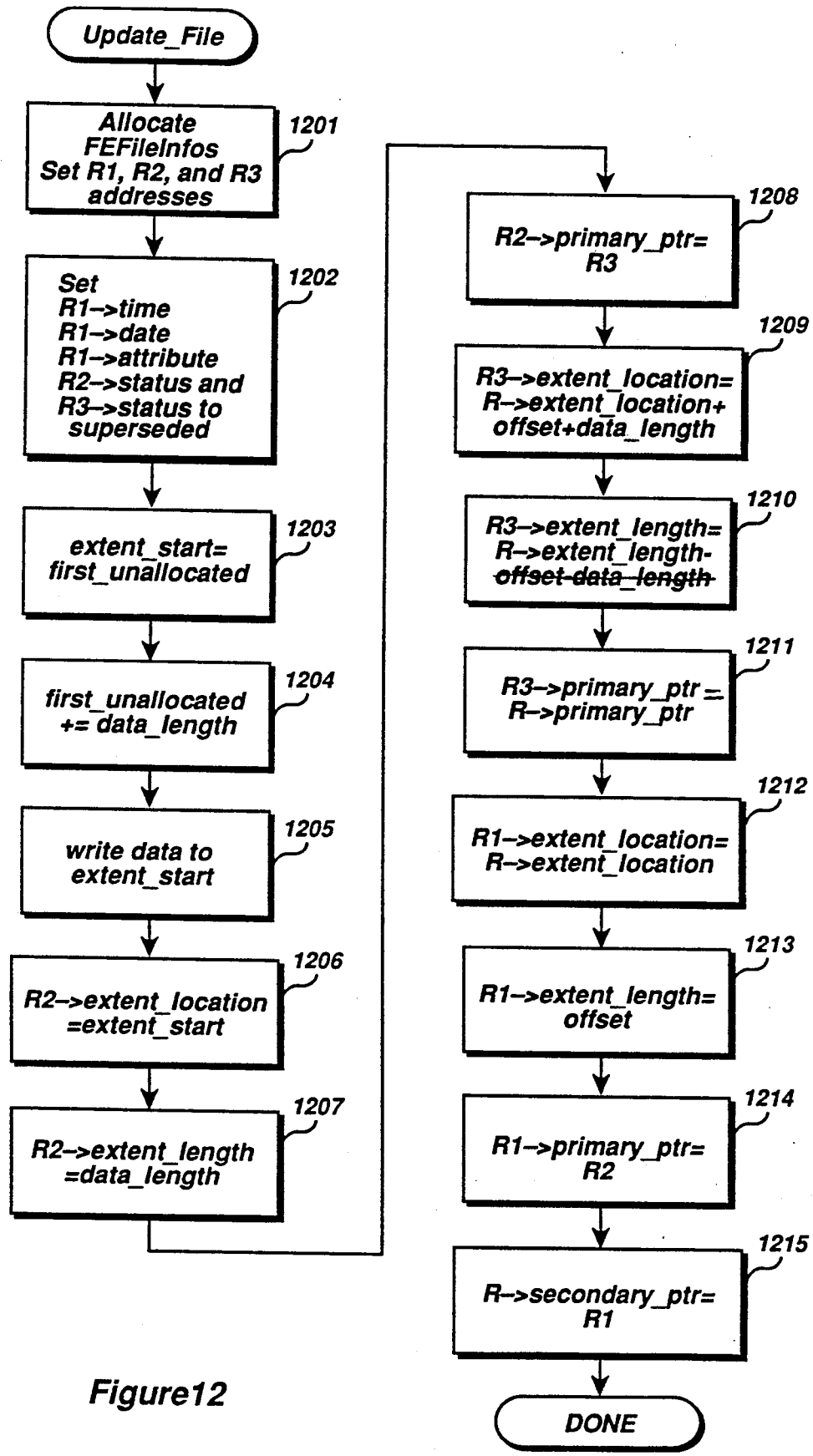
FIG. 12 shows a flow diagram of the Update_File routine in a preferred embodiment of the present invention.

FIG. 12 shows a flow diagram for the routine that updates the data in a file. The parameters for this routine are R, the address of the FEFileEntry or FEFileInfo block that is to have its associated extent modified; extent_offset, the offset into the extent for the new data; new_data, the new data; data_length, the length of the new data. Since the FEProm is effectively a write once device, at least until everything is erased, an area where data is stored cannot be rewritten when an update to a file occurs. In a preferred embodiment, the updated data is written to a different area of the FEProm, as described below.

Figure 13:
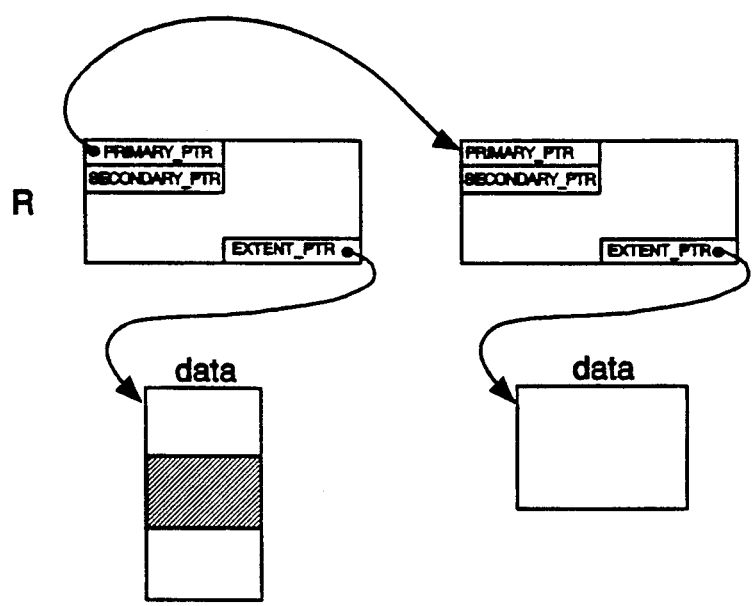
FIGS. 13 and 14 show a sample portion of a file before and after it is updated in a preferred embodiment of the present invention.
Figure 14:
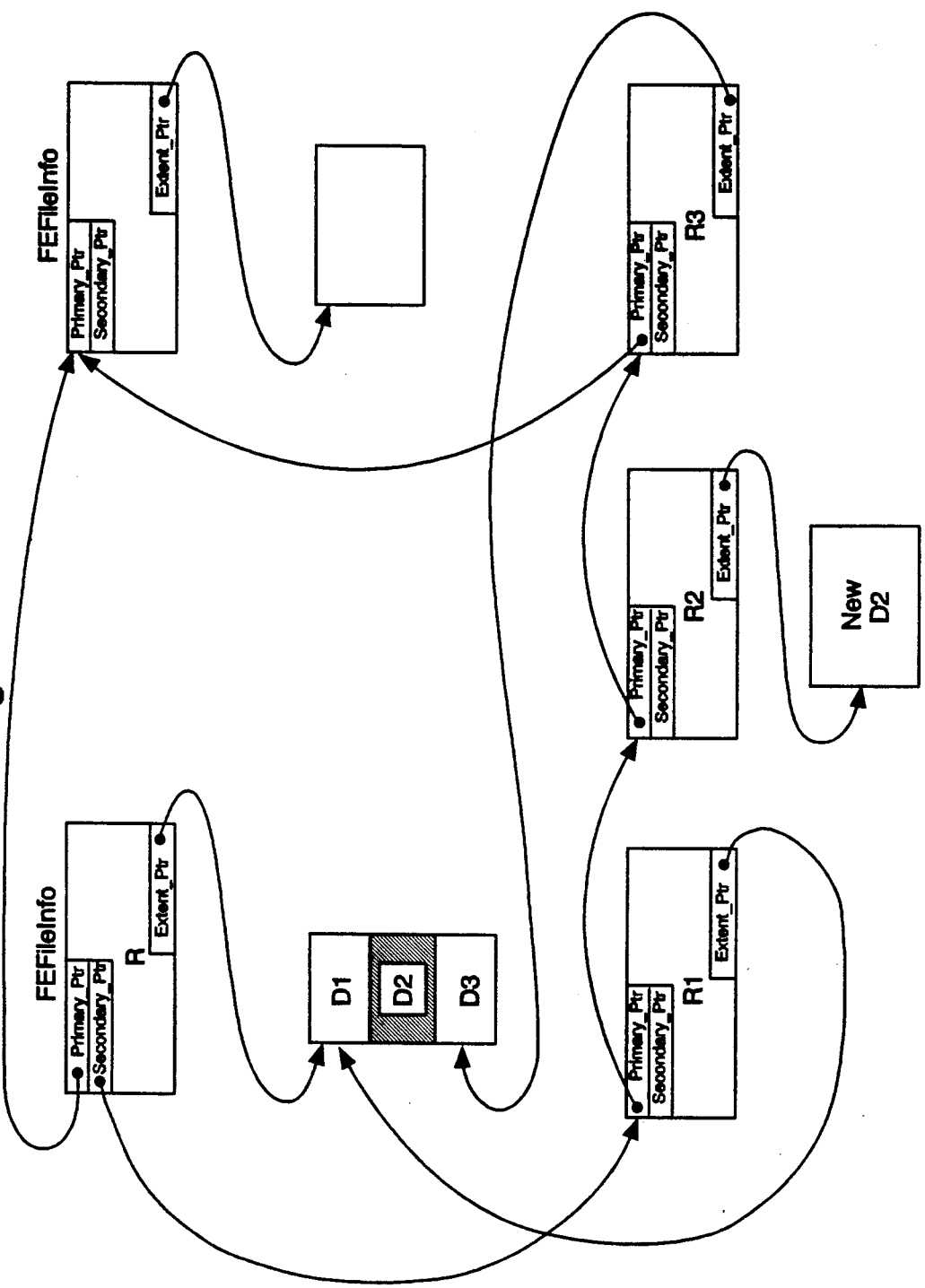

FIG. 13 shows a typical portion of the linked list of the FEFileInfo records for a file. The Update_File routine will replace the data represented by the shaded area. FIG. 14 shows the structure of the linked list after the modified data has been written to the FEProm. Three FEFileInfo records, R1, R2, and R3, have been inserted into the linked list. The entire extent is not rewritten, rather only the portion that actually changed is rewritten. The routine divides the extent into three sections, D1, D2, and D3. Sections D1 and D3 contain data that is not changed by the update, and section D2 contains the data that will change. Each section will have a corresponding FEFileInfo record. The FEFileInfo records R1, R2, and R3 are linked through their primary_ptr. Also, the extent_location field in R1 and R3 point to their corresponding extent sections and the extent length fields are set. However, a new extent has been allocated for the changed data corresponding to the new D2 section, which is pointed to by record R2. The secondary_ptr of record R points to FEFileInfo R1 to indicate that the primary_ptr of R is suspended. The primary_of FEfileInfo record R3 is set to the value contained in the primary_ptr of FEFileInfo record R to complete the link.

In block 1201, the system allocates three FEFileInfo records and sets the pointers R1, R2, and R3 to contain the addresses. R1 is allocated with and R2 and R3 are allocated without the attribute data. In block 1202, the system sets R1—>time, R1—>date, and R1—>attributes and R2—>status and R3—>status to superseded. In block 1203 and 1204, the system allocates a record of data_length for the new data. In block 1203, the system sets the variable extent_start equal to first_unallocated. In block 1204, the system increments first_unallocated by data_length. In block 1205, the system writes new_data to the FEProm starting at the address extent_start.

In blocks 1206 through 1208, the system sets the data in FEFileInfo record R2. In block 1206, the system sets R2—>extent_location equal to extent_start. In block 1207, the system sets R2—>extent_length equal to data_length. In block 1208, the system sets R2—>primary_ptr to R3.

In blocks 1209 through 1211, the system sets the data in FEFileInfo record R3. In block 1209, the system sets R3—>extent_location equal to R—>extent_location plus extent_offset plus data_length, which is the start address of section D3. In block 1210, the system sets R3—>extent_length equal to R—>extent_length minus R3—>extent_location. In block 1211, the system sets R3—>primary_pointer equal to R—>primary_ptr.

In blocks 1212 through 1214, the system sets the data in FEFileInfo record R1. In block 1212, the system sets R1—>extent_location equal to R—>extent_location. In block 1213, the system sets R—>extent_length equal to extent_offset. In block 1214, the system sets (R1—>primary_otr to R2.

In block 1215, the system sets R—>secondary_ptr equal to R1, which indicates that the primary_ptr is superseded, and then the routine is done.

Figure 15:
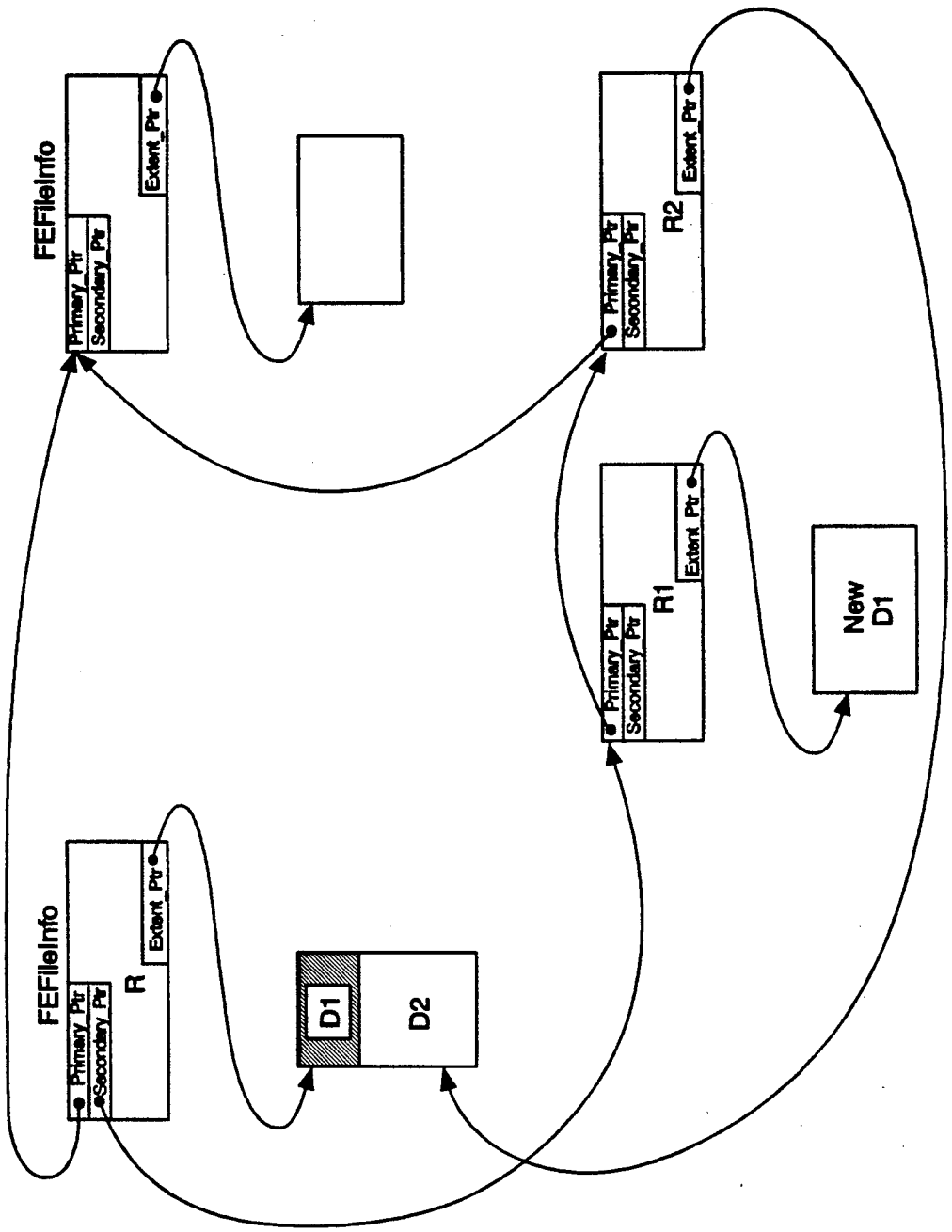
FIGS. 15, 16 and 17 show sample portions of a file after the file is updated in a preferred embodiment of the present invention.
Figure 16:
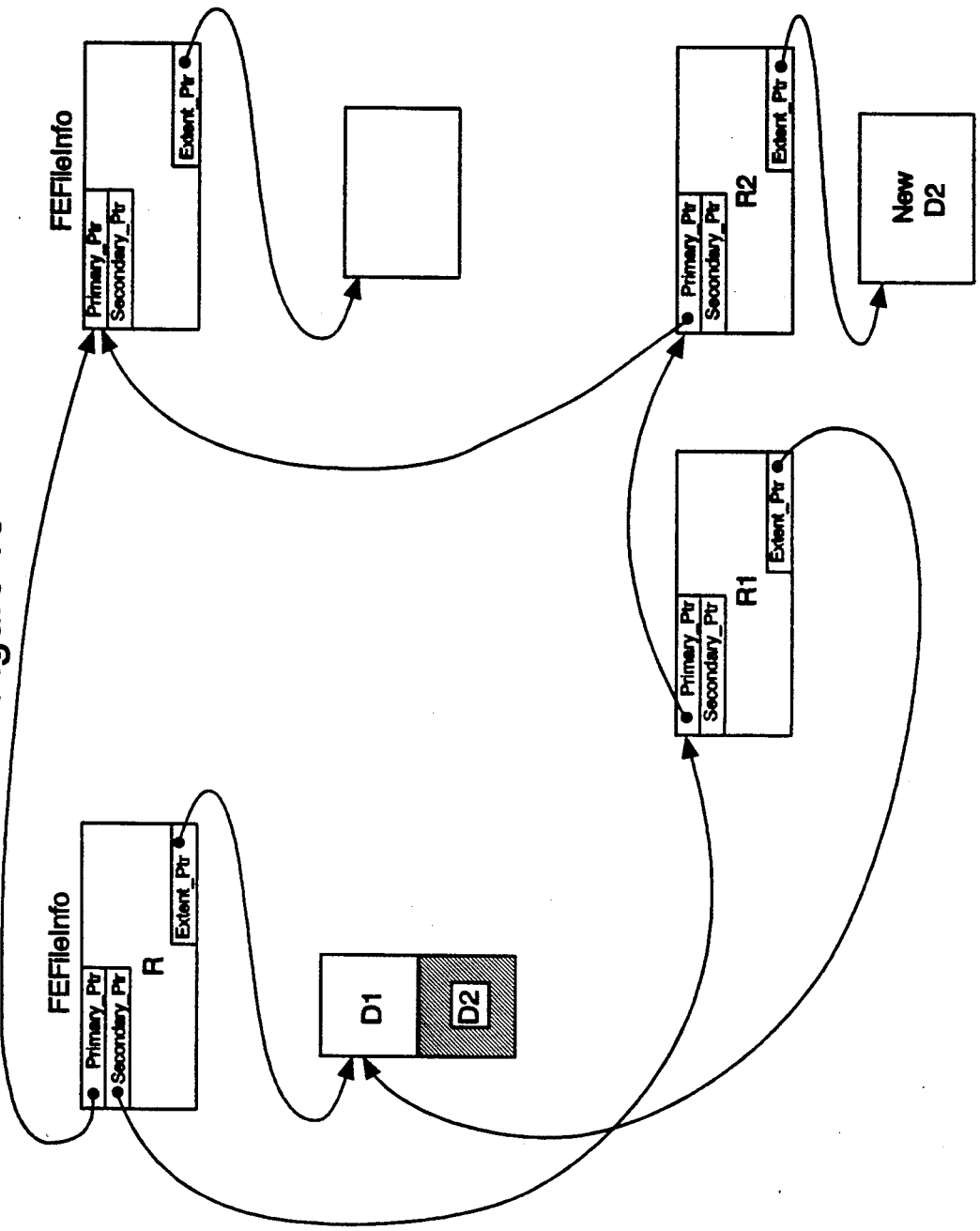

FIGS. 15 and 16 show the FEFileInfo list for a couple special cases of file updates. The routine for processing for these special cases is a subset of the routine needed for processing the general case, Update_File, shown in FIG. 12. In FIG. 15, data starting at the beginning of an extent is updated. Section D1 contains the data at the beginning of the extent to be updated and section D2 contains the data at the end of the extent that is not updated. Only two new FEFileInfo records are needed. The first FEFileInfo record R1 points to the new data and the second FEFileInfo record R2 points to the old data. A similar situation occurs when data that ends on an extent boundary is updated as shown in FIG. 16.

Figure 17:
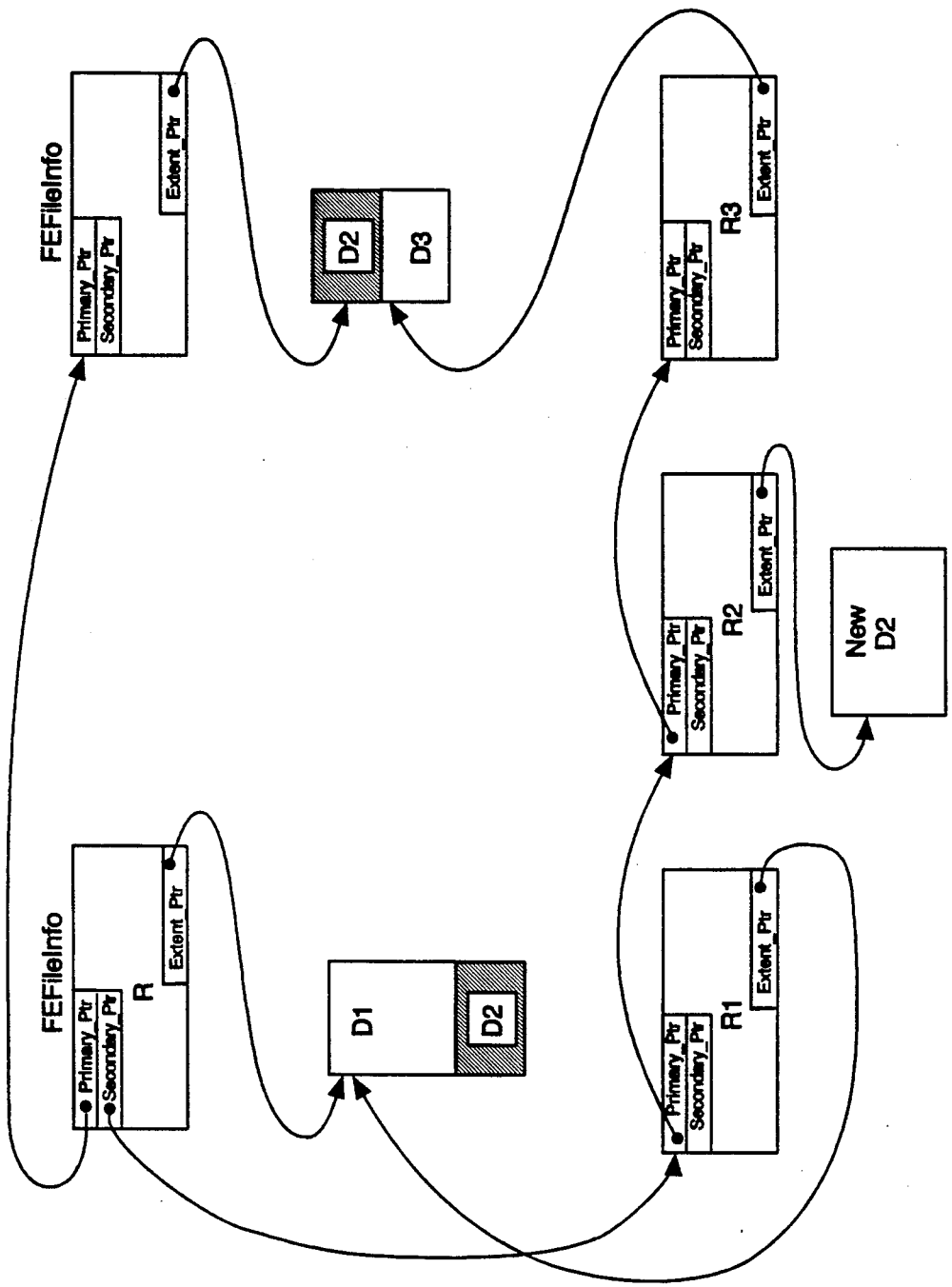

FIG. 17 shows a linked list for FEFileInfo records when the updated data spans extent boundaries.

Figure 18:
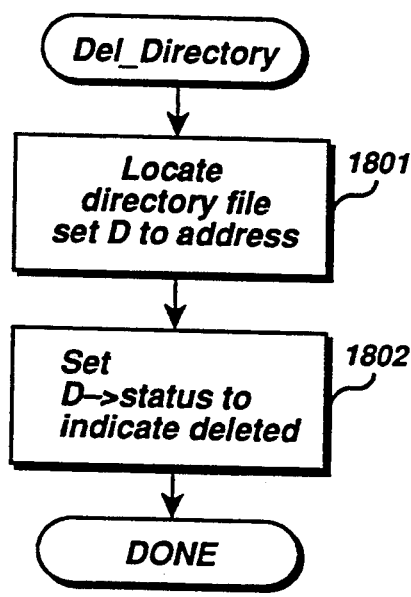
FIG. 18 shows a flow diagram of the Del_Directory routine in a preferred embodiment of the present invention.

FIG. 18 shows a flow diagram of a routine that deletes a directory or file from the FEProm. This routine clears the exist/delete bit in the FEDirEntry. In block 1801, the system locates the directory or file to be deleted and sets the pointer D to contain the address of the directory or file. In block 1802, the system sets D—>status to indicate that the directory or file is deleted and the routine completes.

Figure 20:
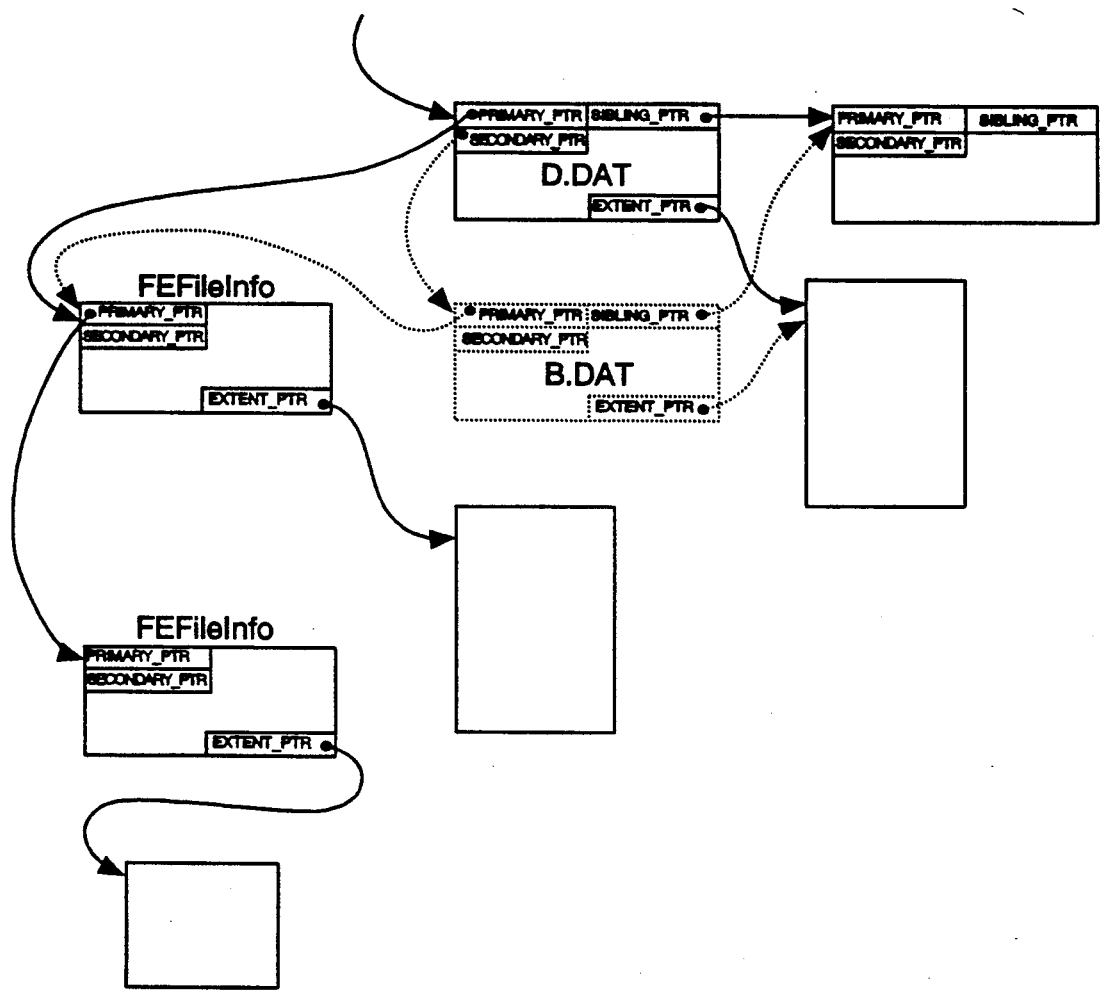
FIG. 20 shows the before and after representation of the directory structure for a file that has had its name changed.

The name of a directory or file is changed by allocating a new FEDirEntry or FEFileEntry, respectively, and then setting the secondary_ptr of the old entry to point the new entry. FIG. 20 shows the file entry for "D.DAT" in solid lines and the changes in broken lines when the name is changed to "B.DAT." The new entry points to the linked list of FEFileInfo entries, the directory structure, and the extent associated with the old entry.

Figure 19:
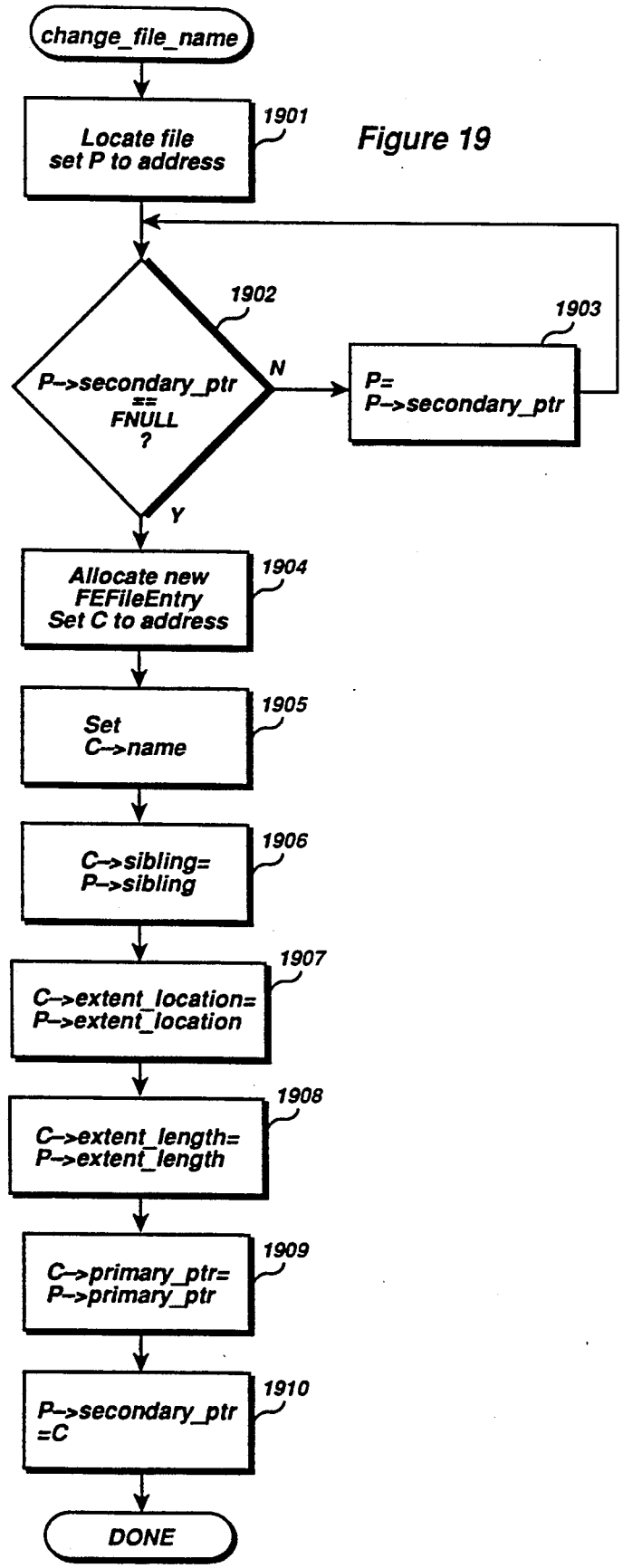
FIG. 19 shows a flow diagram of the Change_File_Name routine in a preferred embodiment of the present invention.

FIG. 19 is a flow diagram of a preferred subroutine that implements the changing of a file name. (The subroutine for changing a directory is similar, except that there are no associated extents.) The input parameters to this routine are the pathname of the file and the new file name. In block 1901, the system searches through the directory structure and locates the file whose name is to be changed and sets the variable P to point to the FEFileEntry. In block 1902 and 1903, the system searches for the last FEFileEntry in the linked list of entries for the file. A file will have an entry for each name change In block 1902, if P—>secondary_ptr equals FNULL, then P points to the end of the linked list and the system continues at block 1904, else P does not point to the end of the linked list and the system continues at block 1903. In block 1903, the system sets P equal to P—>secondary_otr to walk through the linked list.

In block 1904, the system allocates a new FEFileEntry and sets the variable C to point to the entry. In block 1905, the system set C—>name equal to the new file name. In block 1906, the system sets C—>sibling equal to P—>sibling to link the entry into the directory hierarchy. In blocks 1907 and 1908, the system sets C—>extent_location and C—>extent_length equal to P—>extent_location and P—>extent_length, respectively, to link the new entry to the extent. In block 1909, the system sets C—>primary_ptr equal to P—>primary_ptr to link the new entry to the list of extents. In block 1910, the system sets P—>secondary_ptr equal to C to complete the replacement of the old entry and the routine completes.

Figure 22:
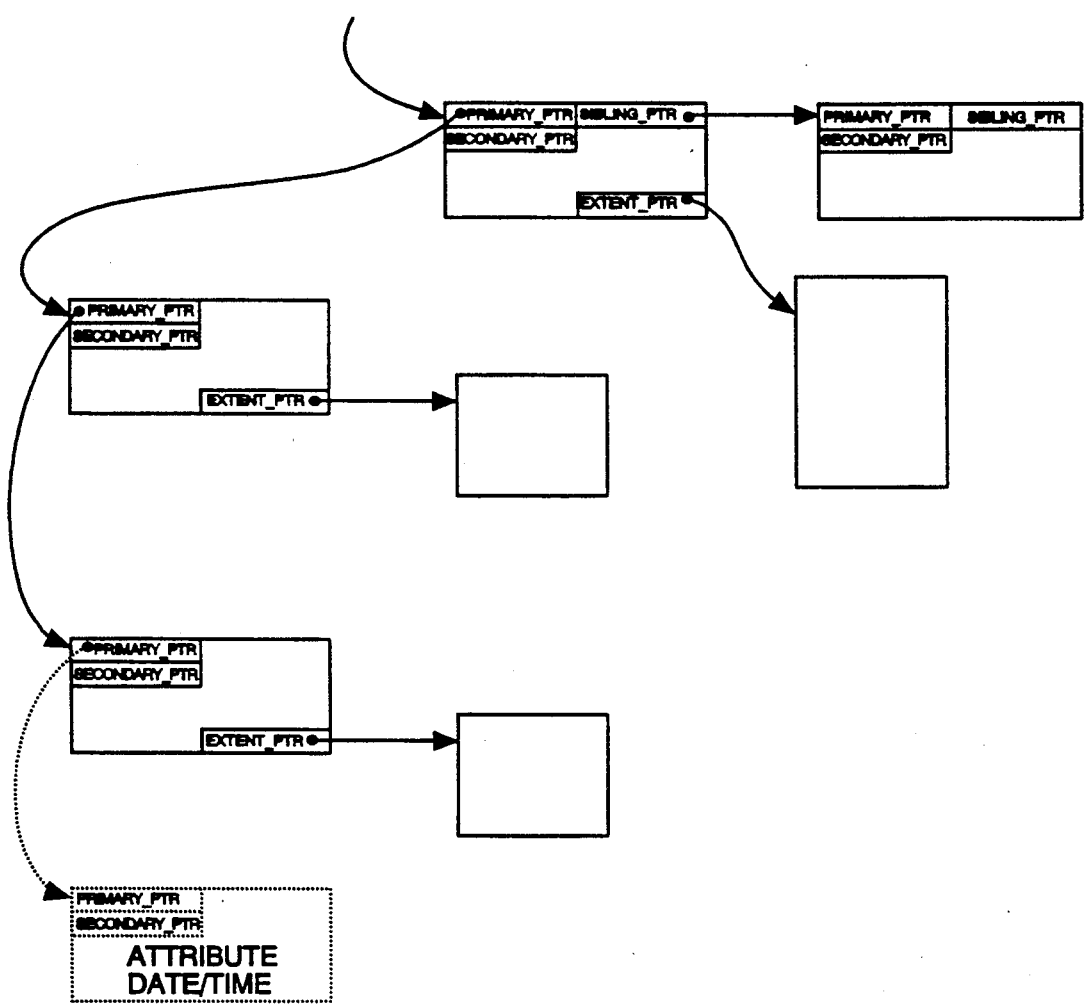
FIG. 22 shows the before and after representation of the directory structure for a file that has had its attribute date changed.

The attribute data associated with a file are changed by adding a new FEFileInfo entry onto the linked list of FEFileInfo entries. All FEFileInfo entries except the last are set to indicate that the attribute data have been superseded. FIG. 22 shows the linked list arrangement before the attribute data change in solid lines and after the attribute data the change in broken lines. No extent is associated with the FEFileInfo entry that is added as a result of an attribute data change.

Figure 21A:
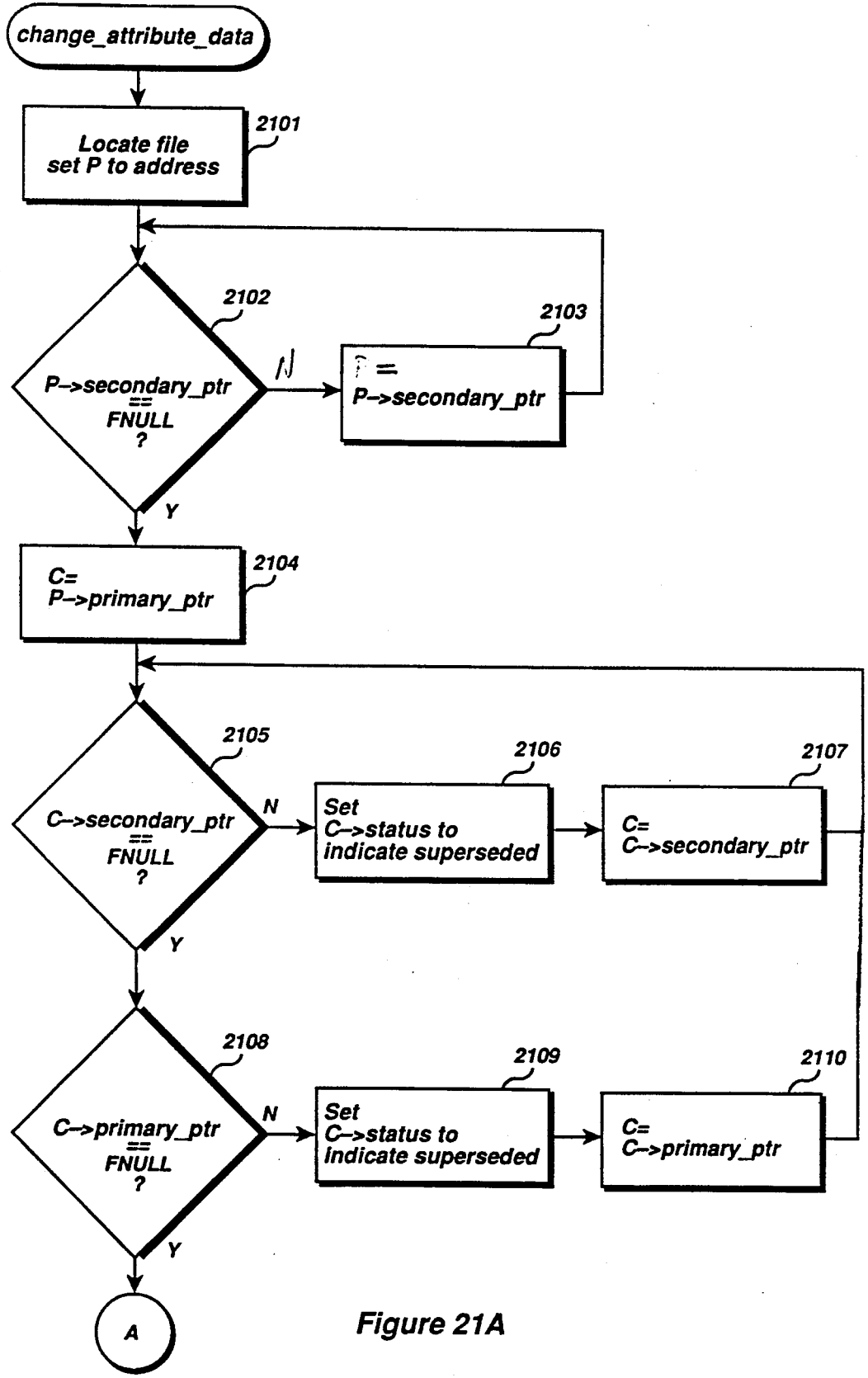
FIGS. 21A and 21B show a flow diagram of the Change_Attribute_Data routine in a preferred embodiment of the present invention.
Figure 21B:
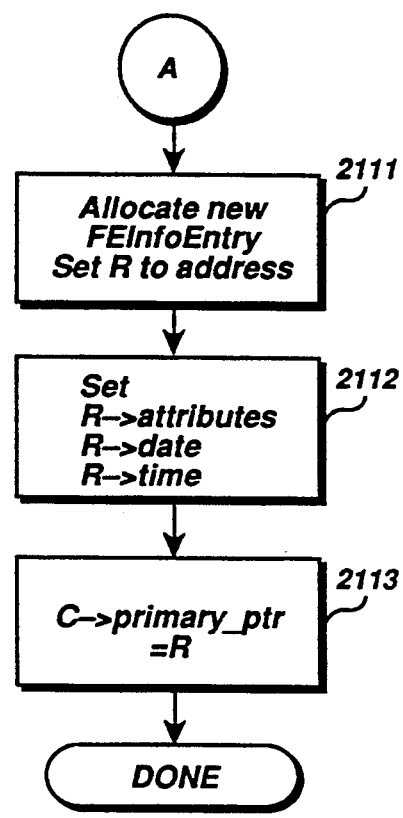

FIGS. 21A and 21B show a flow diagram of a routine that changes the attribute data of a file. The input parameters are the pathname and the attribute data. In block 2101, the system searches through the directory structure to locate the file and sets the variable P to point to the FEFileEntry. In block 2102 and 2103, the system searches for the last FEFileEntry in the linked list of entries for the file. A file will have an entry for each name change. In block 2102, if P—>secondary_ptr equals FNULL, then P points to the end of the linked list and the system continues at block 2104, else P does not point to the end of the linked list and the system continues at block 2103. In block 2103, the system sets P equal to P—>secondary_ptr to walk through the linked list.

In block 2104, the system sets the variable C equal to P—>primary_ptr, which points to the linked list of FEFileInfo entries for the file. In blocks 2105 through 2110, the system searches through the FEFileInfo entries for the last entry. If a secondary_ptr is set, the system follows that path, otherwise it follows the primary_ptr. If both primary_ptr and secondary_ptr are equal to FNULL, then the system has located the end of the linked list. In block 2105, if C—>secondary_ptr equals FNULL, then the system continues at block 2108, else the system continues at block 2106. In block 2106, the system sets C—>status to indicate that the attribute data are superseded. The new FEFileInfo entry will contain the new attribute data. In block 2107, the system sets C equal C—>secondary_ptr to traverse the linked list and the system loops to 2105.

In block 2108, if C—>primary_ptr equals FNULL, then C points to the last FEFileInfo record in the list and the system continues at block 2111, else the system continues at block 2109. In block 2109, the system sets C—>status to indicate that the attribute data are superseded. The new FEFileInfo entry will contain the new attribute data. In block 2110, the system sets C equal C—>primary_ptr to traverse the linked list and the system loops to 2105.

In block 2111, the system allocates a new FEFileEntry and sets the variable R to point to the entry. In block 2112, the systems sets the attribute data for the new file entry. In block 2113, the system sets C—>primary_ptr equals R to link the new entry with the other FEFileInfo entries and the routine completes.

In an alternate preferred embodiment, the FEFileEntry records and the FEFileInfo records are allocated after the space for extent is allocated. Storing in this manner has two advantages. First, it ensures that the allocated space will never end in an FNULL. Second, several writes can be combined into one large extent. The combining of the writes can occur up to the point at which FEDirEntry, FEFileEntry, or a FEFileInfo (for a different file) are to be added to the FEProm. At that point, the combined FEFileInfo record could be written out.

Although the present invention has been described in terms of preferred embodiment, it is not intended that the invention be limited to this embodiment. Modifications within the spirit of the invention will be apparent to those skilled in the art. The scope of the present invention is defined by the claims that follow.

We claim:

1. A method of updating data stored on a computer memory file storage device with new data, the memory containing records of data, each record having a primary pointer and a secondary pointer, the records stored as a linked list that is linked by the primary pointers, the method comprising the steps of:

locating a record that contains data to be updated, the record being contained in the memory comprising a plurality of bits such that once a bit is changed from a predefined bit value to another bit value the changed bit cannot be individually changed back to the predefined bit value, the data including bits that have been changed from the predefined bit value to the other bit value, the secondary pointer of the located record having each bit set to the predefined bit value;

allocating a record to contain the new data, the record being allocated in the memory, each bit of the allocated record being set to the predefined bit value;

writing the new data to the allocated record; and setting the secondary pointer in the located record to point to the allocated record to indicate that the new data in the allocated record is an update of the data in the located record by changing at least one bit of the secondary pointer from the predefined bit value to the other bit value wherein the step of locating a record includes the steps of:

(a) selecting a record at which to start a traversal of the linked list;

(b) reading the secondary pointer for the selected record;

(c) if each bit of the read secondary pointer is set to the predefined bit value, then selecting the record pointed to by the primary pointer of the selected record;

(d) if each bit of the read secondary pointer is not set to the predefined bit value, then selecting the record pointed to by the secondary pointer of the selected record; and (e) repeating steps (b) to (d), until the selected record contains the data to be updated.

2. The method of claim 1 including the additional step of setting the primary pointer in the allocated record equal to the primary pointer of the located record.

3. The method of claim 1 or 2 wherein the file storage device is a flash, erasable programmable read only memory.

4. The method of claim 1 wherein the file storage device is logically a stack device, the stack having a top, and the allocated records are allocated on the top of the stack.

5. A computer file storage system for organizing files based on a hierarchical directory structure, the directory structure having a plurality of directory entries, the system comprising:

a computer having a memory for storing directory entries, the memory comprising a plurality of bits such that once a bit is changed from a predefined bit value to another bit value the changed bit cannot be individually changed back to the predefined bit value;

means for allocating a portion of the memory for storing a directory entry, the directory entry having a primary pointer, a secondary pointer, and a sibling pointer, the pointers having a plurality of bits initially being set to the predefined bit value;

means for storing directory data in the directory entry;

means for setting the sibling pointer of the directory entry to point to another directory entry at the same level in the directory structure to form a linked list of sibling directory entries;

means for setting the primary pointer of the directory entry to point to another directory entry at the next level lower in the directory structure;

means for determining whether each bit of the secondary pointer of the directory entry is set to the predefined bit value to indicate that the directory data of the directory entry has not been superseded; and means for setting the secondary pointer of the directory entry to point to a superseding directory entry, the superseding directory entry to contain updated data for the directory entry by changing at least one bit of the secondary pointer from the predefined bit value to the other bit value.

6. The computer file storage system of claim 5 further comprising:

means for setting the primary pointer of the superseding directory equal to the primary pointer of the directory entry; and mean for setting the sibling pointer of the superseding directory entry equal to the sibling pointer of the directory entry.

7. The computer file storage system of claim 5 further comprising:

means for allocating a portion of the memory for storing a file entry, the file entry to contain information relating to a file; and means for setting the primary pointer of the directory entry to point to the file entry.

8. The computer file storage system of claim 7 wherein the file entry contains a primary pointer, a secondary pointer, and a sibling pointer, the file entry pointers having a plurality of bits initially being set to the predefined bit value, including:

means for setting the sibling pointer of the file entry to point to another file entry to form a linked list of file entries; and means for setting the secondary pointer of the file entry to point to a superseding file entry, the superseding file entry to contain updated data for the file entry.

9. The computer file storage system of claim 8 further comprising:

means for setting the primary pointer of the superseding file entry equal to the primary pointer of the file entry; and means for setting the sibling pointer of the superseding file entry equal to the sibling pointer of the file entry.

10. The computer file storage system of claim 7 further comprising:

means for allocating a portion of the memory for storing a file information entry, the file information entry to contain information relating to a file extent; and means for setting the primary pointer of the file entry to point to the file information entry.

11. The computer file storage system of claim 10 wherein the file information entry contains a primary pointer and secondary pointer, the file information entry pointers having a plurality of bits initially being set to the predefined bit value, further comprising:

means for setting the primary pointer of the file information entry to point to another file information entry associated with the same file to form a linked list of file information entries for that same file; and means for setting the secondary pointer of the file information entry to point to a superseding file information entry, the superseding file information entry to contain updated data for the file information entry.

12. The computer file storage system of claim 11 further comprising:

means for setting the primary pointer of the superseding file information entry equal to the primary pointer of the file information entry.

13. The computer file storage system of claim 5, 6, 7, 8, 9, 10, 11, or 12 wherein the memory is a flash, erasable, programmable read-only memory.

14. A computer file storage system for storing files, the system comprising:

a computer having a memory for storing the files, the memory comprising a plurality of bits such that once a bit is changed from a predetermined bit value to another bit value the changed bit cannot be individually changed back to the predefined bit value;

means for allocating a portion of the memory for storing a file entry, the file entry to contain information relating to a file and containing a primary pointer, a secondary pointer, and a sibling pointer, the information and pointers having a plurality of bits initially being set to the predefined bit value;

means for storing information relating to the associated file in the file entry;

means for setting the sibling pointer of the file entry to point to another file entry to form a linked list of file entries;

means for determining whether each bit of the secondary pointer of the file entry is set to the predefined bit value to indicate that the information of the file entry has not been superseded; and means for setting the secondary pointer of the file entry to point to a superseding file entry, the superseding file entry to contain updated information for the file entry by changing at least one bit of the secondary pointer from the predefined bit value to the other bit value.

15. The computer file storage system of claim 14 further comprising:

means for setting the primary pointer of the superseding file entry equal to the primary pointer of the file entry; and means for setting the sibling pointer of the superseding file entry equal to the sibling pointer of the file entry.

16. The computer file storage system of claim 14 including:

means for allocating a portion of the memory for storing a file information entry, the file information entry to contain information relating to a file extent of a file, the file information entry containing a primary pointer and a secondary pointer, each of the file information entry pointers having a plurality of bits initially being set to the predefined bit value;

means for setting the primary pointer of the file entry to point to the file information entry;

means for setting the primary pointer of a file information entry to point to another file information entry associated with the same file to form a linked list of file information entries for the same file; and means for setting the secondary pointer of the file information entry to point to a superseding file information entry, the superseding file information entry to contain updated information for the file information entry.

17. The computer file storage system of claim 16 further comprising:

means for setting the primary pointer of the superseding file information entry equal to the primary pointer of the file information entry.

18. The computer file storage system of claim 14, 15, 16, or 17 wherein the memory is a flash, erasable, programmable read-only memory.

19. A method of updating data stored on a computer memory device with new data, the memory device containing records of data, each record having a secondary pointer, the method comprising the steps of:

locating a record that contains data to be updated, the record being contained in the memory device comprising a plurality of bits such that once a bit is changed from a predefined bit value to another bit value the changed bit cannot be individually changed back to the predefined bit value, the data including bits that have been changed from the predefined bit value to the other bit value, the secondary pointer of the located record having each bit set to the predefined bit value;

allocating a record to contain the new data, the record being allocated in the memory, each bit of the allocated record being set to the predefined bit values;

writing the new data to the allocated record; and setting the secondary pointer in the located record to point to the allocated record to indicate that the new data in the allocated record is an update of the data in the located record by changing at least one bit of the secondary pointer from the predefined bit value to the other bit value wherein the step of locating a record includes the steps of:

(a) selecting a record at which to start a traversal of the linked list;

(b) reading the secondary pointer for the selected record;

(c) if each bit of the read secondary pointer is set to the predefined bit value, then selecting the record pointed to by the secondary pointer of the selected record; and (e) repeating steps (d) to (d), until the selected record contains the data to be updated.

20. The method of claim 19 wherein the step of setting the secondary pointer includes setting a flag in the located record to indicate that the secondary pointer has been changed from the a predefined bit value.

21. The method of claim 19 or 20 wherein the computer memory device is a flash, erasable, programmable read-only memory.

22. The method of claim 19 wherein the step of locating a record includes determining an address of a first unallocated portion in the memory.

23. The method of claim 22 wherein the device has a plurality of locations, each location identified by an address, the addresses being sequential, the device having a beginning location and an ending location, the device having an allocated portion of contiguous locations and an unallocated portion of contiguous locations, the allocated portion being positioned starting at the beginning address, the unallocated portion being positioned ending at the ending address, each bit of each location in the allocated portion being set to the predefined bit value, and wherein the step for determining an address of a first unallocated location includes the steps of:

(a) setting a search pointer equal to the address of the ending location;

(b) retrieving data stored at the location pointed to by the search pointer;

(c) comparing each bit of the retrieved data with the predefined bit value;

(d) if each bit of the retrieved data is equal to the predefined bit value, adjusting the search pointer to point to the next contiguous location;

(e) repeating steps (b), (c), and (d) until at least one bit of the retrieved data is not equal to the predefined bit value; and (f) if at least one bit of the retrieved data is not equal to the predefined bit value, setting the address of the first unallocated location equal to the address of the last location rom which each bit of the retrieved data was equal to the predefined bit value.

24. The method of claim 23 wherein the allocated portion of contiguous locations has a last location, including the step of:

ensuring that at least one bit of the last location in the allocated portion of contiguous locations contains a bit value other than the predetermined bit value.

25. The method of claim 22, 23, or 24 wherein the memory device is a flash, erasable, programmable read-only memory.

26. A method for determining an address of a first unallocated location in a memory device, the device having a plurality of locations, each location identified by an associated address, the addresses being sequential, the device having a beginning location and an ending location, the device having an allocated portion of contiguous locations and an unallocated portion of contiguous locations, the allocated portion being positioned starting at the beginning address, the unallocated portion being positioned ending at the ending address, each bit of the unallocated portion being set to a predefined value, the method comprising the steps of:

(a) setting a search pointer equal to the address of the ending location;

(b) retrieving the bits stored a he location pointed to by the search pointer, the location comprising a plurality of bits such that once a bit is changed from the predefined value to another value the changed bit cannot be individually changed back to the predefined value;

(c) comparing the retrieved bits with the predefined value;

(d) if each of the retrieved bits is equal to the predefined value, adjusting the search pointer to point to the next contiguous location;

(e) repeating steps (b), (c), and (d) until at least one of the retrieved bits is not equal to the predefined value; and (f) if at least one of the retrieved bits is not equal to the predefined value, setting the address of the first unallocated location equal to the address of the last location from which each of the retrieved bits was equal to the predefined value.

27. The method of claim 26, wherein the allocated portion of contiguous locations has a last location, including the additional step of:

ensuring that at least one bit of the last location in the allocated portion of the contiguous locations contains a value other than the predefined value.

28. The method of claim 26 or 27 wherein the memory device is a flash, erasable, programmable read-only memory.

29. A method of updating a logically contiguous set of data with updated data, the data comprising a plurality of extents, each extent comprising a logically contiguous subset of the set of data, each extent having an associated extend header, the extent header having a primary pointer, a secondary pointer, and an extent pointer, the primary pointers linking the extent headers in a linked list, the extent pointers pointing to the extent associated with the header, the method comprising the steps of:

locating an extent header associated with an extent to be updated, the located extent header comprising a predefined bit value to another bit value the changed bit cannot be individually changed back to the predefined bit value, the secondary bit pointer of the located extent header having each bit set to the predefined bit value;

allocating an extent header, the allocated extent header comprising a plurality of bits such that once a bit is changed from the predefined bit value to another bit value the changed bit cannot be individually changed back to the predefined bit value, each bit of the allocated extent header being set to the predefined bit value;

setting the secondary pointer in the located extent header to point to the allocated extent header by changing at least one bit of the secondary pointer from the predefined bit value to the other bit value;

setting the primary pointer in the allocated extent header equal to the primary pointer of the located extent header by changing at least one bit of the primary pointer from the predefined bit value to the other bit value;

allocating an extent to store the updated data;

storing the updated data in the allocated extent; and setting the extent pointer in the allocated extent header to point to the allocated extent by changing at least one bit of the extent pointer from the predefined bit value to the other bit value.

30. The method of claim 29 comprising the additional steps of:
setting the primary pointer in the allocated extent header to point to another allocated extent header, when updating only a portion of the data in the extent to be updated; and
setting the extent pointer in the other allocated extent to point to a portion of data in the extent to be updated, wherein the portion of data is not to be updated.

31. The method of claim 29 or 30 wherein the memory device is a flash, erasable, programmable read-only memory.

* * * * *

UNITED STATES PATENT AND TRADEMARK OFFICE
CERTIFICATE OF CORRECTION

PATENT NO. : 5,247,658

DATED : September 21, 1993

INVENTOR(S) : Phillip L. Barrett et al

It is certified that error appears in the above-indentified patent and that said Letters Patent is hereby corrected as shown below:

In column 14, claim 6, line 43, after "directory" and before "equal", please insert --entry--.

In column 16, claim 16, lines 25 and 26, after "information entry" and before ", the superseding", please delete "to point to a superseding file information entry" which is redundant.

In column 17, claim 19, line 3, please delete "secondary" and substitute therefor --primary--.

In column 17, claim 19, line 4, please delete "and"

In column 17, claim 19, between subtext "(c)" and subtext "(e)", please insert subtext --(d) if each bit of the read secondary pointer is not set to the predefined bit value, then selecting the record pointed to by the secondary pointer of the selected record; and--.

In column 17, claim 19, line 5, please delete the first occurring "(d)" and substitute therefor --(b)--.

In column 17, claim 23, line 46, please delete "rom" and substitute therefor --from--.

In column 17, claim 24, line 53, please delete "predetermined" and substitute therefor --predefined--.

In column 18, claim 26, line 3, please delete "a he" and substitute therefor --at the--.

In column 18, claim 29, line 36, please delete "extend" and substitute therefor --extent--.

UNITED STATES PATENT AND TRADEMARK OFFICE
CERTIFICATE OF CORRECTION

PATENT NO. : 5,247,658

DATED : September 21, 1993

INVENTOR(S) : Phillip A. Barrett et al

It is certified that error appears in the above-indentified patent and that said Letters Patent is hereby corrected as shown below:

In column 18, claim 29, line 43, after "comprising a" and before "predefined", please insert --plurality of bits such that once a bit is changed from a--.

Signed and Sealed this

Twenty-fifth Day of October, 1994

Attest:

BRUCE LEHMAN

*Attesting Officer*    *Commissioner of Patents and Trademarks*